United States Patent
Phillips et al.

(10) Patent No.: US 11,741,333 B2
(45) Date of Patent: Aug. 29, 2023

(54) MATCHING OPERATING PARAMETERS IN A SMART CARD

(71) Applicant: IDEX BIOMETRICS ASA, Oslo (NO)

(72) Inventors: Garret Orren Phillips, Pittsford, NY (US); Imre Knausz, Fairpoint, NY (US)

(73) Assignee: IDEX BIOMETRICS ASA, Oslo (NO)

( * ) Notice: Subject to any disclaimer, the term of this patent is extended or adjusted under 35 U.S.C. 154(b) by 126 days.

(21) Appl. No.: 17/139,328

(22) Filed: Dec. 31, 2020

(65) Prior Publication Data

US 2022/0207319 A1 Jun. 30, 2022

(51) Int. Cl.
G06K 19/07 (2006.01)
G06K 19/077 (2006.01)
H02M 3/155 (2006.01)

(52) U.S. Cl.
CPC ... G06K 19/07777 (2013.01); G06K 19/0718 (2013.01); G06K 19/07756 (2013.01); H02M 3/155 (2013.01)

(58) Field of Classification Search
CPC ............. G06K 19/07; G06K 19/0701; G06K 19/0707; G06K 19/0708; G06K 19/0709; G06K 19/0715; G06K 19/0718; G06K 19/0723; G06K 19/0726; G06K 19/077; G06K 19/07749; G06K 19/0775; G06K 19/07756; G06K 19/07773; G06K 19/07777; G06K 19/07779
See application file for complete search history.

(56) References Cited

U.S. PATENT DOCUMENTS

| | | | | |
|---|---|---|---|---|
| 9,806,767 | B2* | 10/2017 | Walley | G06K 19/0715 |
| 10,872,284 | B2* | 12/2020 | Frandsen | G06K 19/0708 |
| 2008/0157732 | A1 | 7/2008 | Williams | |
| 2012/0086282 | A1* | 4/2012 | Lee | H02J 50/80 307/82 |
| 2019/0236321 | A1 | 8/2019 | Poon et al. | |
| 2019/0258833 | A1* | 8/2019 | Caselli | G06K 7/10148 |
| 2020/0265285 | A1 | 8/2020 | Paidimarri et al. | |
| 2021/0406631 | A1* | 12/2021 | Jang | G06K 19/077 |

OTHER PUBLICATIONS

International Search Report and Written Opinion with Transmittal dated Apr. 28, 2022 in International Application No. PCT/EP2021/087842 (12 pages).

* cited by examiner

*Primary Examiner* — Thien M Le
*Assistant Examiner* — April A Taylor
(74) *Attorney, Agent, or Firm* — Rothwell, Figg, Ernst & Manbeck, P.C.

(57) ABSTRACT

A smart card inlay comprising an inductive antenna and a DC-DC converter. The inductive antenna is configured to (i) communicate wirelessly with a card terminal, and (ii) power card circuitry via inductive coupling to the card terminal. The DC-DC converter has an input coupled to the inductive antenna and an output connectable to card circuitry. The DC-DC converter is configured to receive an input power signal from the inductive antenna and convert that input power signal to an output power signal to send to the card circuitry, the output power signal matching the operating current and/or operating voltage of the card circuitry.

38 Claims, 14 Drawing Sheets

MATCHING OPERATING PARAMETERS IN A SMART CARD

BACKGROUND

This disclosure relates to powering circuitry on a smart card. The circuitry may have, for example, biometric functionality.

A smart card refers to a device that includes one or more embedded integrated circuit chips and internal memory. The internal memory may be located on the integrated circuit chip, or be a separate chip embedded within the card. Smart cards exist in a wide variety of form factors, including plastic cards, key fobs, watches, wearables, electronic passports and USB-based tokens and subscriber identification modules (SIMs) used in mobile phones.

A smart card can be a contact card, a contactless card, or capable of operating as a contact and a contactless card. A contact card communicates with, and is powered by, a card terminal via direct physical contact with the card terminal. Conversely, a contactless card communicates with a card terminal without direct physical contact. Typically, a contactless card communicates with a card terminal via radio waves. The contactless card may include an antenna to receive an electromagnetic signal, such as an RF signal, emitted from the card terminal. Likewise, data from the card can be communicated back to the card terminal by means of the card's antenna. The contactless card is powered by harvesting power from the RF signal.

FIG. 1 illustrates circuitry for transferring power from a card terminal 101 to a typical contactless smart card 102. Near Field Communication (NFC) driver source 103 generates a driving signal which is transmitted wirelessly to smart card 102 via inductive coupling of inductive antenna 104 of card terminal 101 to inductive antenna 105 of smart card 102. Capacitor 106 in parallel with inductive antenna 105 act as a power coupling circuit to couple power to the card circuitry 107. The values of the inductance $L_2$ and capacitance $C_1$ are chosen at manufacture such that the resonant frequency of the power coupling circuit is tuned to match that of the driving signal.

Input voltage levels to smart cards vary. For example, when powered by direct contact with the card terminal, the ISO/IEC 7816-3 standard defines three voltage input levels: Class A at 5V (±10%), Class B at 3V (±10%) and Class C at 1.8V (±10%). When powered contactlessly with the card terminal, the voltage induced in the card depends on the distance the card is held from the card terminal. The ISO/IEC 14443 standard specifies the carrier frequency of the RF driving signal sent from the card terminal to be 13.56 MHz. The ISO/IEC 14443 standard also requires that a contactless smart card should function properly when placed within a defined operating volume. The operating volume is a 3D space defined between the contactless smart card and the so-called "landing plane" of the card terminal. The landing plane is the area of the card terminal which a contactless card needs to be brought proximal to enable the card terminal to communicate wirelessly with the card. A logo is typically located on the landing plane to identify it as such to the user.

Early generation smart cards had limited on-card functionality, typically just RFID circuitry. The power requirements of this on-card circuitry were relatively low. As smart card technology has developed, the on-card circuitry has been called on to implement increasingly varied and complex functionality. For example, it is known to incorporate a biometric sensor in a smart card for the purpose of identifying a user of the smart card, and for another action such as a payment to be authorised on the basis of the user's identity being verified. Incorporating further functionality such as this in the card circuitry on the smart card has led to increased power requirements by the card circuitry. For a contactless card, all the energy required to power the functionality of the card circuitry must be derived from the driving signal received from the card terminal, which remains at the frequency of 13.56 MHz specified by the ISO/IEC 14443 standard. In order to derive sufficient power from the card terminal to operate those smart cards having more complex functionality, the user typically has to bring the smart card closer to the landing plane of the card terminal.

The card circuitry may comprise several constituent integrated circuits. These constituent integrated circuits are required to operate within the same ranges, i.e. using the same operating current and voltage. A voltage regulator may be used to reduce the power received from the card terminal to a level which all the constituent circuits operate at. The requirement that the constituent integrated circuits are operable with common operating ranges limits the choice of which integrated circuits can be incorporated into the card circuitry. Lowering overall power available to the card circuitry also limits processing capability, thereby increasing transaction times with the card terminal.

It is desirable to increase the functionality of smart cards, increase their usability by reducing their transaction times and, for the case of smart cards with contactless functionality, enable them to operate when held at a greater distance from the landing plane of the card terminal.

SUMMARY OF THE INVENTION

According to a first aspect, there is provided a smart card inlay comprising: an inductive antenna configured to (i) communicate wirelessly with a card terminal, and (ii) power card circuitry via inductive coupling to the card terminal; and a DC-DC converter having an input coupled to the inductive antenna and an output connectable to card circuitry, the DC-DC converter configured to receive an input power signal from the inductive antenna and convert that input power signal to an output power signal to send to the card circuitry, the output power signal matching the operating current and/or operating voltage of the card circuitry.

The DC-DC converter may comprise a switched capacitive network operable in phases.

The DC-DC converter may be configured to reduce the voltage of the input power signal to the operating voltage of the card circuitry using a step-down converter.

The step-down converter may be configured to reduce the voltage of the input power signal by an integer factor.

The step-down converter may have a plurality of modes, each mode reducing the voltage of the input power signal by a different factor.

The step-down converter may be operable in a first mode which reduces the voltage of the input power signal by a factor of 1, and a second mode which reduces the voltage of the input power signal by a factor of 2.

The step-down converter may be configured to dynamically change from one mode of the plurality of modes to another mode of the plurality of modes.

The step-down converter may be configured to dynamically change modes in response to a change in voltage of the input power signal.

The step-down converter may be configured to: measure the voltage of the input power signal; compare the measured voltage to a threshold voltage; if the measured voltage does not exceed the threshold voltage, operate in a first mode; and if the measured voltage does exceed the threshold voltage, operate in a second mode, wherein the voltage of the input power signal is reduced by a greater factor in the second mode than in the first mode.

The step-down converter may be configured to dynamically change modes in response to sensitivity of current operations of the card circuitry to noise.

The DC-DC converter may be coupled to the inductive antenna via a voltage regulator.

The smart card inlay may further comprise a capacitor connected in parallel with the inductive antenna, the capacitor connectable in parallel with the card circuitry, wherein the inductive antenna and capacitor form a power coupling circuit, the power coupling circuit having a resonant frequency aligned with the card terminal's driving signal resonant frequency.

The card terminal's driving signal resonant frequency may be specified by the contactless integrated circuit card specification ISO/IEC 14443.

The impedance of the card terminal as reduced by the DC-DC converter and capacitor may match the impedance of the card circuitry.

The smart card inlay may further comprise the card circuitry, wherein the card circuitry is configured to communicate wirelessly with the card terminal via the inductive antenna.

The smart card inlay may further comprise the card circuitry, wherein the card circuitry comprises a biometric sensor configured to sense biometric data of a user.

The card circuitry may further comprise a biometric processor configured to perform a biometric verification process to verify the identity of the user from the sensed biometric data.

The smart card inlay may comprise a plurality of inlay segments, the inductive antenna and capacitive network being distributed across the plurality of inlay segments.

The smart card inlay may be comprised within a smart card. The smart card may further comprise card circuitry.

The DC-DC converter may be configured to change the voltage of the input power signal to the operating voltage of the card circuitry using a step-up converter.

The DC-DC converter may be configured to increase the voltage of the input power signal to the operating voltage of the card circuitry using the step-up converter.

The step-up converter may be configured to increase the voltage of the input power signal by an integer factor.

The step-up converter may have a plurality of modes, each mode increasing the voltage of the input power signal by a different factor.

The step-up converter may be operable in a first mode which increases the voltage of the input power signal by a factor of 1, a second mode which increases the voltage of the input power signal by a factor of 2, and a third mode which increases the voltage of the input power signal by a factor of 3.

The step-up converter may be configured to dynamically change from one mode of the plurality of modes to another mode of the plurality of modes.

The step-up converter may be configured to dynamically change modes in response to a change in voltage of the input power signal.

The step-up converter may be configured to: measure the voltage of the input power signal; if the measured voltage exceeds a first threshold voltage, operate in a first mode; if the measured voltage exceeds a second threshold voltage but does not exceed the first threshold voltage, operate in a second mode; and if the measured voltage does not exceed the second threshold voltage, operate in a third mode; wherein the voltage of the input power signal is increased by a greater factor in the second mode than in the first mode, and the voltage of the input power signal is increased by a greater factor in the third mode than in the second mode.

The DC-DC converter may further comprise a voltage regulator connected to the output of the step-up converter, the voltage regulator configured to reduce the voltage output by the step-up converter to the operating voltage of the card circuitry.

The DC-DC converter may have a further input couplable to a contact terminal, the contact terminal configured to communicate with the card terminal and power the card circuitry, the DC-DC converter configured to receive an input power signal from the card terminal.

The step-up converter may be configured to dynamically change modes in response to whether the input power signal is received from the contact terminal or the inductive antenna.

The DC-DC converter may be couplable to the contact terminal via a voltage regulator.

The smart card inlay, card circuitry and a contact terminal may be comprised within a smart card.

The DC-DC converter may be configured to change the voltage of the input power signal to the operating voltage of the card circuitry using an inverting converter.

The inverting converter may be configured to provide a voltage below ground.

The inverting converter may comprises at least one capacitive charge pump.

The smart card inlay may further comprise the card circuitry, wherein the card circuitry comprises an active biometric sensor configured to sense biometric data of a user.

The DC-DC converter may comprise a step-down converter and a step-up converter.

The DC-DC converter may comprise a step-down converter, a step-up converter, and an inverting converter.

BRIEF DESCRIPTION OF THE DRAWINGS

The present disclosure will now be described by way of example with reference to the accompanying drawings. In the drawings.

DETAILED DESCRIPTION

The following description relates to contactless smart cards, contact smart cards and "dual-interface" smart cards. Dual-interface smart cards are those which are capable of communicating with a card terminal both in a contact mode via a physical communication interface, and in a contactless mode via a contactless communication interface.

The following description refers to a smart card interacting with a card terminal. The smart card may have any one of several form factors, including a plastic card, a key fob, a dongle, a security token (e.g. a USB token), an electronic passport, or a subscriber identification module (SIM) used in a mobile phone. The smart card could be implemented within a device integrated into a communication device such as a mobile phone or smartphone. The smart card could be a wearable device, such as a bracelet, a watch, a glove/pair of gloves, a pin (e.g. a brooch), or a badge. The card terminal may, for example, be a card reader, an ATM, or a point of sale terminal.

The smart card may have a card body which is the same size and shape as a conventional smart card. Alternatively, the card body may have a different size and/or shape as a conventional smart card. The card may be cuboid in shape, with one dimension substantially less than both the others, for example less than 10% of either of the other dimensions. The thickness of the card may be between 0.5 mm and 2.0 mm. The card may satisfy the physical dimensions set out in the ISO 7810 standard for an ID-1 card.

Contactless smart cards or dual-interface smart cards operating in a contactless mode harvest power from the RF field at their antenna whilst the antenna receives communications from the card terminal. The power coupling circuit of FIG. 1 was designed to transfer power to card circuitry (such as RFID circuitry) which had much lower power requirements than what was available to be harvested from the RF communications from the card terminal. Because of this, the efficiency of the power transfer to the card circuitry was not a concern. However, the power coupling circuit of FIG. 1 continues to be used, even with more complex card circuitry with higher operating current requirements.

Figure 2:
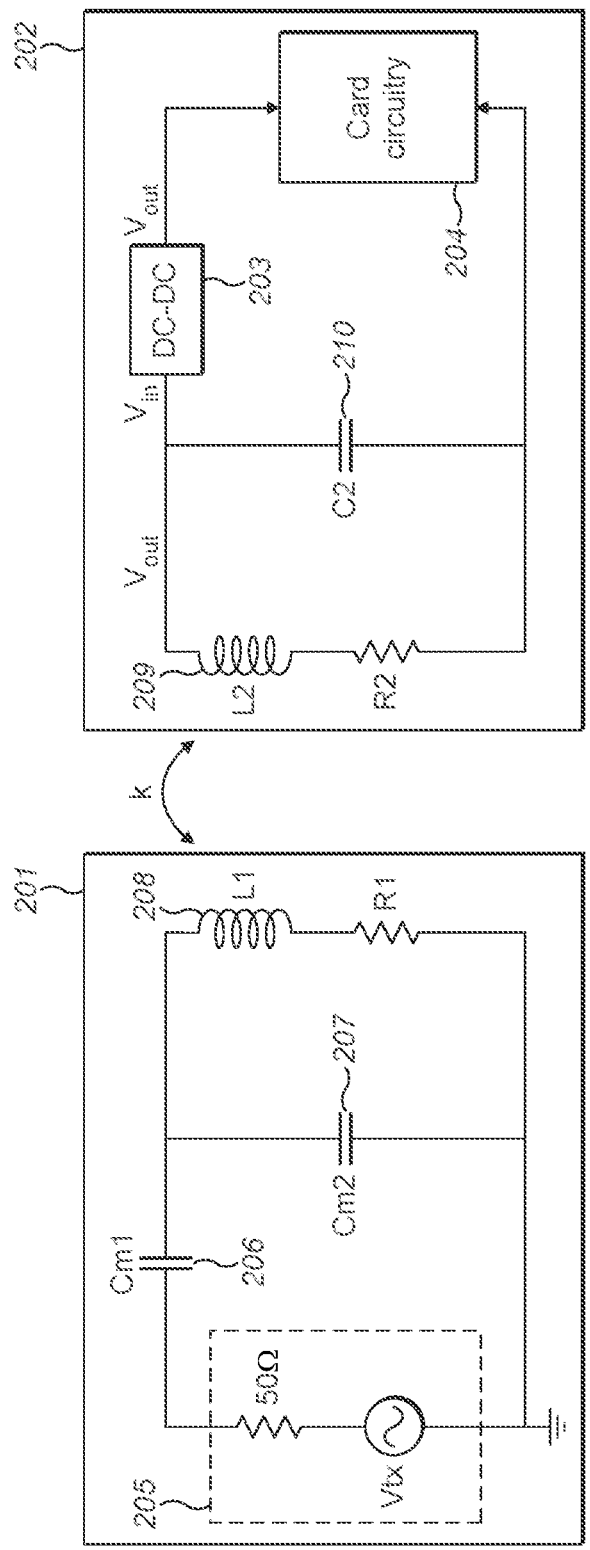
FIG. 2 illustrates circuitry for wirelessly transferring power from a card terminal to a smart card with a DC-DC converter.

FIG. 2 illustrates circuitry for wirelessly transferring power from a card terminal 201 to a smart card 202 which uses a DC-DC converter 203 at the smart card to moderate the signal presented to the card circuitry 204 such that that signal matches the operating current and/or operating voltage of the card circuitry. Only a contactless interface of the smart card for communicating with the card terminal is illustrates on FIG. 2, however the smart card may additionally comprise a contact interface for direct connection to the card terminal.

The card terminal 201 comprises an NFC driver source 205 which generates a driving signal. If the terminal is operating according to the ISO/IEC 14443 standard for contactless integrated circuit cards, then the carrier frequency of the RF driving signal sent from the card terminal is 13.56 MHz. The card terminal 201 may comprise a matching network which matches the driver source 205 to the inductive antenna L1 208. The matching network illustrated in FIG. 2 comprises two capacitors 206 and 207, the first of which is connected in series between the driver source 205 and the inductive antenna 208, and the second of which is connected in parallel between the driver source 205 and the inductive antenna 208. Each of the driver source 205 and inductive antenna 208 are shown having an internal resistance, which is 50Ω for the driver source 205 and R1 for the inductive antenna 208. The driving signal is transmitted wirelessly from the card terminal 201 to the smart card 202 via inductive coupling of the inductive antenna 208 of the card terminal 201 to an inductive antenna 209 of the smart card 202. These antennas are coupled together with a coupling value k, which is a function of the distance between the antennas. The smart card both (i) receives communication from the card terminal via the driving signal, and also (ii) harvests power from the driving signal. The smart card may transmit communications back to the card terminal via inductive coupling of the inductive antennae 208 and 209.

The smart card 202 comprises the inductive antenna 209 (shown with internal resistance R2) connected to card circuitry 204 via a matching network. In this example, the matching network comprises a capacitor C2 210 which is connected in parallel between the inductive antenna 209 and the card circuitry 204. The capacitor C2 210 and inductive antenna 209 together form an LC circuit whose resonant frequency is tuned (via the chosen capacitance of C2) to align with the resonant frequency of the driving signal from the card terminal. This alignment may take into consideration loading effects. Thus, for example, the resonant frequency of the LC circuit may be tuned to be a little higher than the resonant frequency of the driving signal from the card terminal. For example, the alignment may be such that the resonant frequency of the LC circuit is tuned to be in the range 0 to 3 MHz higher than the resonant frequency of the card terminal. As another example, the alignment may be such that the resonant frequency of the LC circuit is tuned to be in the range 0.5 to 2 MHz higher than the resonant frequency of the card terminal. These ranges may apply, for example, when the resonant frequency of the card terminal is 13.56 MHz as required by the ISO/IEC 14443 standard. Antenna 209 of smart card 202 may comprise one, two, three or more coils of conductive material. The antenna may be a wire antenna. Alternatively, the antenna may be a printed antenna.

The card circuitry 204 communicates wirelessly with the card terminal 201 via the inductive antenna 209. The card circuitry 204 may convey data via amplitude modulation of the carrier signal as defined in the ISO/IEC 14443 standard. Specifically, the card circuitry may modulate the amplitude of the signal inductively coupled to the card terminal by load modulation. The card circuitry may switch a load in and out of the circuit shown in FIG. 2. This causes the voltage of the signal which is coupled to the card terminal to collapse and expand. This modulation of the voltage is detected by the card terminal and interpreted as data in accordance with the ISO/IEC 14443 standard. Typically, 5-10% of the signal is modulated in this way.

The card circuitry 204 may additionally include circuitry for performing a secondary function. For example, the card circuitry 204 may include circuitry having biometric functionality. The biometric functionality may conveniently be implemented on a single integrated circuit. Suitably, the biometric circuitry comprises a biometric controller having a processor and a memory. The memory has a region which stores in a non-transitory manner code that is executable by the processor to perform logic functions of the biometric circuitry. The memory may also have a region which stores biometric validation data.

The biometric circuitry comprises a biometric sensor for sensing biometric data of a user. The nature of the biometric sensor will depend on the type of biometric data that is to be used. Some examples are: a fingerprint sensor for capturing fingerprints; a camera for capturing facial images, retina images or iris images; a vein pattern sensor for capturing vein patterns; a microphone for capturing voice patterns; or an accelerometer for capturing movement data. The biometric circuitry may include multiple sensors for capturing multiple types of biometric data, or for capturing multiple instances of biometric data of the same type: for example for capturing fingerprints on both sides of the card simultaneously.

The biometric validation data represents reference biometric data for an authorised user of the card. Alternatively, such biometric validation data may be stored in the communication circuitry. Biometric data captured by the biometric sensor is used in a biometric recognition or authentication process. In such a process, the biometric data is compared with the validation data to assess whether it is representative of the authorised user, for example by one of the following processes: fingerprint recognition; iris recognition; vein recognition; retina recognition; voice recognition; behavioural recognition; facial recognition, etc. That comparison may be done in the biometric circuitry, e.g. by the processor. Alternatively, or in addition, that comparison may be done by a processor in the communication circuitry.

The biometric circuitry may be separate (logically and/or physically) from the communication circuitry. For example, the biometric circuitry and communication circuitry may be distinct components (such as separate IC chips) each embedded within the card.

The card circuitry may have a different secondary function. For example, the card circuitry may include circuitry having one of more of: display functionality, keypad functionality, audio functionality, and location functionality for example using a GPS chip etc.

The smart card 202 further comprises a DC-DC converter 203 connected in series between the inductive antenna 209 and the card circuitry 204. The DC-DC converter 203 receives an input power signal from the inductive antenna 209 and outputs an output power signal to card circuitry 204. The DC-DC converter modifies the voltage/current of the signal input to it such that the signal it outputs matches the operating current/voltage of the card circuitry. The impedance of the card terminal as reduced by the DC-DC converter 203 and capacitor 210 matches the impedance of the card circuitry. Or viewed another way, the DC-DC converter 203 and capacitor 210 translate the effective impedance of the card circuitry by a factor of N to better match the impedance of the card terminal.

The DC-DC converter 203 may be a step-down converter, a step-up converter, an inverting converter or any combination of these three converter types.

In the example in which the DC-DC converter 203 is a step-down converter, the step-down converter converts the input power signal from the inductive antenna 209 to the output power signal to send to the card circuitry by reducing the voltage of the input power signal to the operating voltage of the card circuitry.

Figure 3:
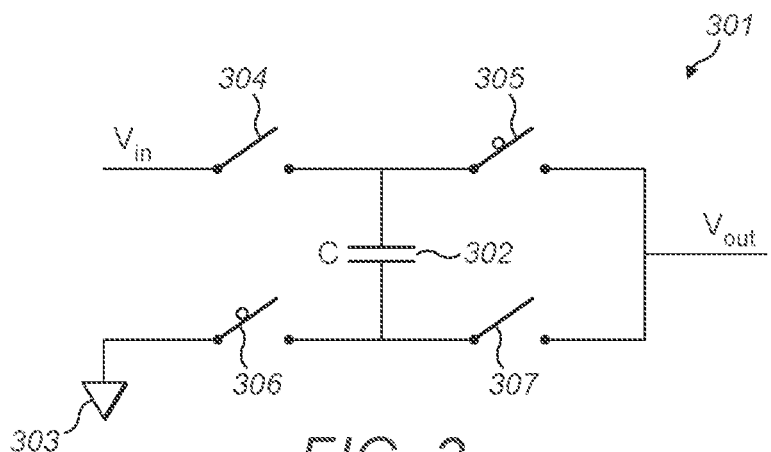
FIG. 3 illustrates an exemplary step-down converter.

FIG. 3 illustrates an exemplary step-down converter 301 which may be incorporated into the smart card 202 of FIG. 2 as the DC-DC converter 203. The Vin signal line on FIG. 3 is the input to DC-DC converter 203 on FIG. 2. The Vout signal line on FIG. 3 is the output of the DC-DC converter 203 shown on FIG. 2. This step-down converter 301 shown in FIG. 3 comprises a switched capacitive network operable in two phases. The capacitive network comprises capacitor 302 which is connected in series between Vin and ground 303, and is connected in parallel with Vout. The step-down converter comprises four switches. Two switches 304 and 305 are connected in series between Vin and Vout. The first of these switches 304 is connected between Vin and the capacitor 302. The second of these switches 305 is connected between the capacitor 302 and Vout. Two further switches 306 and 307 are connected in series between ground 303 and Vout. The first of these switches 306 is connected between ground 303 and the capacitor 302. The second of these switches 307 is connected between capacitor 302 and Vout.

The two phases of the step-down converter are enabled utilising non-overlapping clock signals as follows. In the first phase, switches 304 and 307 are closed, and switches 305 and 306 are open. The capacitor 302 stores a charge during this first phase of C(Vin−Vout). In the second phase, switches 304 and 307 are open, and switches 305 and 306 are closed. In this second phase, the negative terminal of the capacitor 302 is connected to ground which causes a voltage of Vin-Vout to be applied to Vout. The charge stored on the capacitor during the first phase is re-distributed between the capacitor and the capacitance on Vout. Once Vout is charged up to a steady state DC value, the following applies:

$$Vout=Vin-Vout \quad \text{(equation 1)}$$

$$Vout=\tfrac{1}{2}Vin \quad \text{(equation 2)}$$

Considering an ideal case in which the step-down converter is 100% efficient, the output power is equal to the input power, i.e. Pin=Pout. Thus:

$$VinIin=VoutIout \quad \text{(equation 3)}$$

$$Iout=2Iin \quad \text{(equation 4)}$$

The voltage of the input power signal, Vin, is given by:

$$Vin=\omega M i_1 Q \quad \text{(equation 5)}$$

where:
M is the mutual inductance of the inductive antennas 208 and 209 given by $M=k\sqrt{L_1 L_2}$, where k is the coupling coefficient between the inductive antennas 208 and 209,
$i_1$ is the card terminal current, and
Q is the quality factor of the smart card determined by the impedance of the card circuitry and the inductance of the inductive antenna, $$Q = \frac{R_{CardCircuitry}}{\omega L_2}.$$

Thus, the step-down converter shown in FIG. 3 converts the input power signal at Vin to an output power signal at Vout which has half the voltage and twice the current. For this reason, the step-down converter of FIG. 3 may be referred to as a half charge pump.

Figure 6:
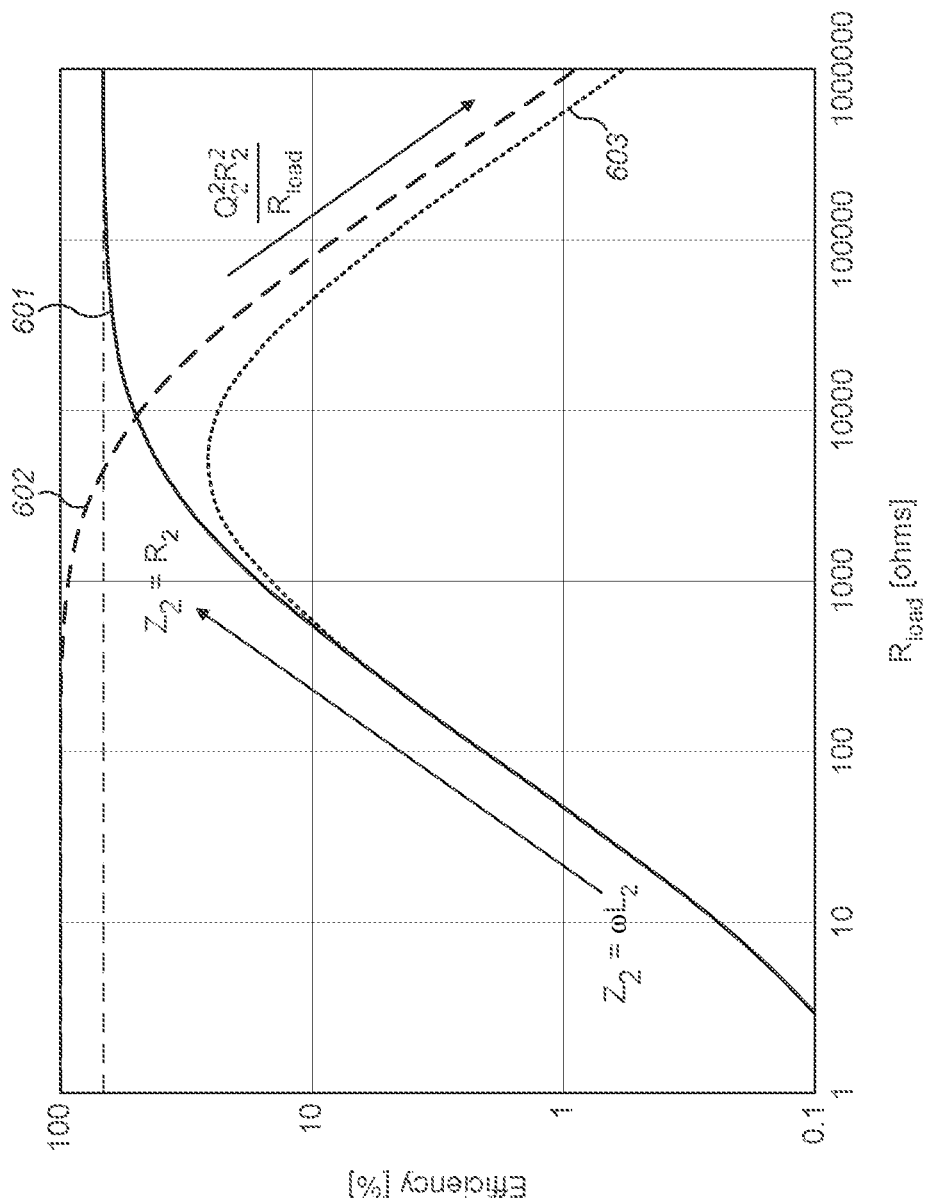
FIG. 6 is a graph illustrating efficiency vs. card circuitry resistance.

The step-down converter acts to optimise the power transfer for a contactless system. FIG. 6 illustrates the ideal load presented to the inductive antenna for maximum power transfer in a contactless system. Curve 601 illustrates the efficiency of the card terminal inductive antenna 208 per resistance of the card circuitry $R_{load}$. Curve 602 illustrates the efficiency of the smart card inductive antenna 209 per resistance of the card circuitry $R_{load}$. Curve 603 illustrates the overall efficiency of the entire system per resistance of the card circuitry $R_{load}$.

This graph shows that the ideal load, $R_{eff}$, for maximum efficiency is when:

$$R_{eff} = \frac{\omega L_2}{k} \quad \text{(equation 6)}$$

For the circuitry of FIG. 2, that ideal load, $R_{eff}$, is a combination of the resistance provided by the card circuitry 204 and the DC-DC converter 203. Thus, the step-down converter of FIG. 2 acts to translate the effective load impedance by a factor of 4 since:

$$R_{eff} = \frac{Vin}{Iin} \quad \text{(equation 7)}$$

$$R_{load} = \frac{Vout}{Iout} \quad \text{(equation 8)}$$

Thus, from equations 2 and 4:

$$R_{eff} = 4 R_{load} \quad \text{(equation 9)}$$

Figure 7:
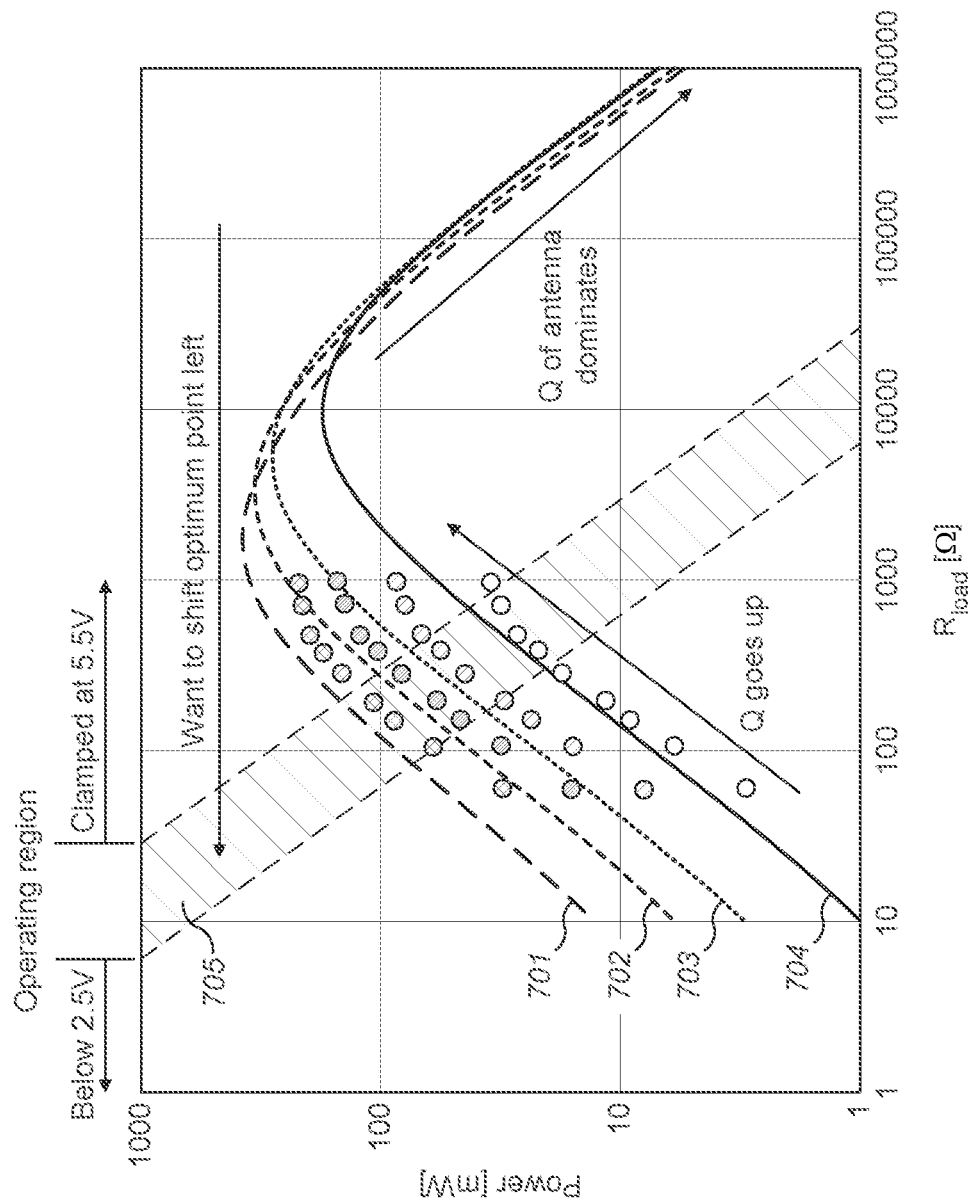
FIG. 7 is a graph illustrating expected and measured values of power vs. card circuitry load for smart cards held at different distances from a card terminal.

At resonance the smart card has a low resistance, and the card circuitry 204 generally has a small resistance. Thus, efficiency in the system is increased by using the step-down converter to provide an effective load which is four times that of the actual load of the card circuitry 204 $R_{load}$, and thereby enable a doubling in the current supplied to the card circuitry 204. FIG. 7 illustrates expected and measured values of power vs. card circuitry load $R_{load}$ for smart cards as shown in FIGS. 2 and 3 held at different distances from the card terminal.

Curve 701 has expected values (solid line) and measured values (dots) for a smart card held 12 mm from the card terminal. Curve 702 has expected values (solid line) and measured values (dots) for a smart card held 21 mm from the card terminal. Curve 703 has expected values (solid line) and measured values (dots) for a smart card held 29 mm from the card terminal. Curve 704 has expected values (solid line) and measured values (dots) for a smart card held 43 mm from the card terminal. The band 705 illustrates the operating region of the smart card as dictated by the voltage range provided by the antenna. This graph demonstrates that in order to improve power transfer to card circuitry 204, it is beneficial to present a larger effective load at the antenna, as is provided by use of the step-down converter.

Figure 1:
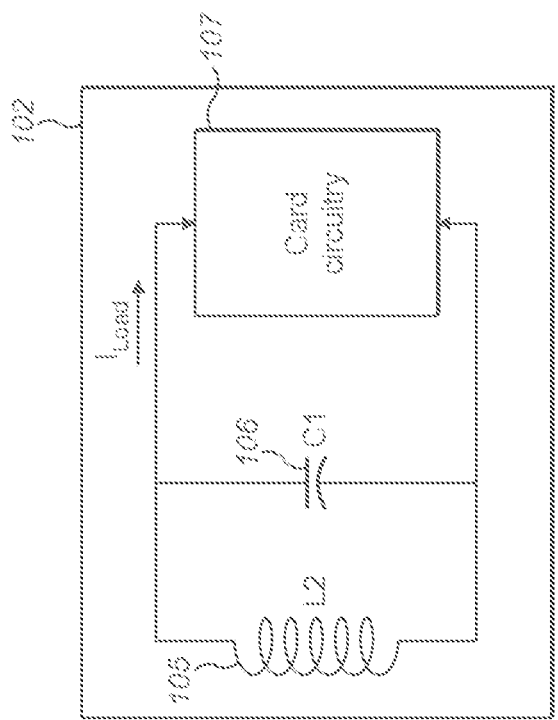
FIG. 1 illustrates circuitry for wirelessly transferring power from a card terminal to a typical contactless smart card.
Figure 1:
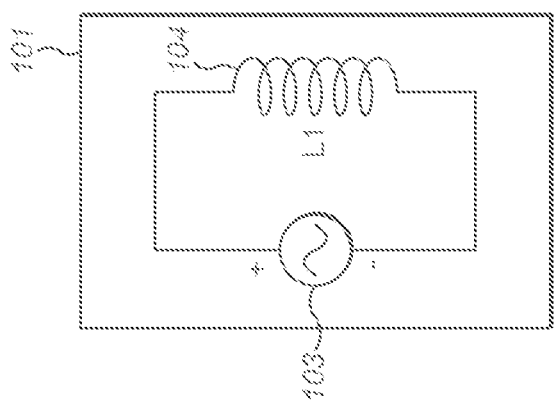
Figure 8:
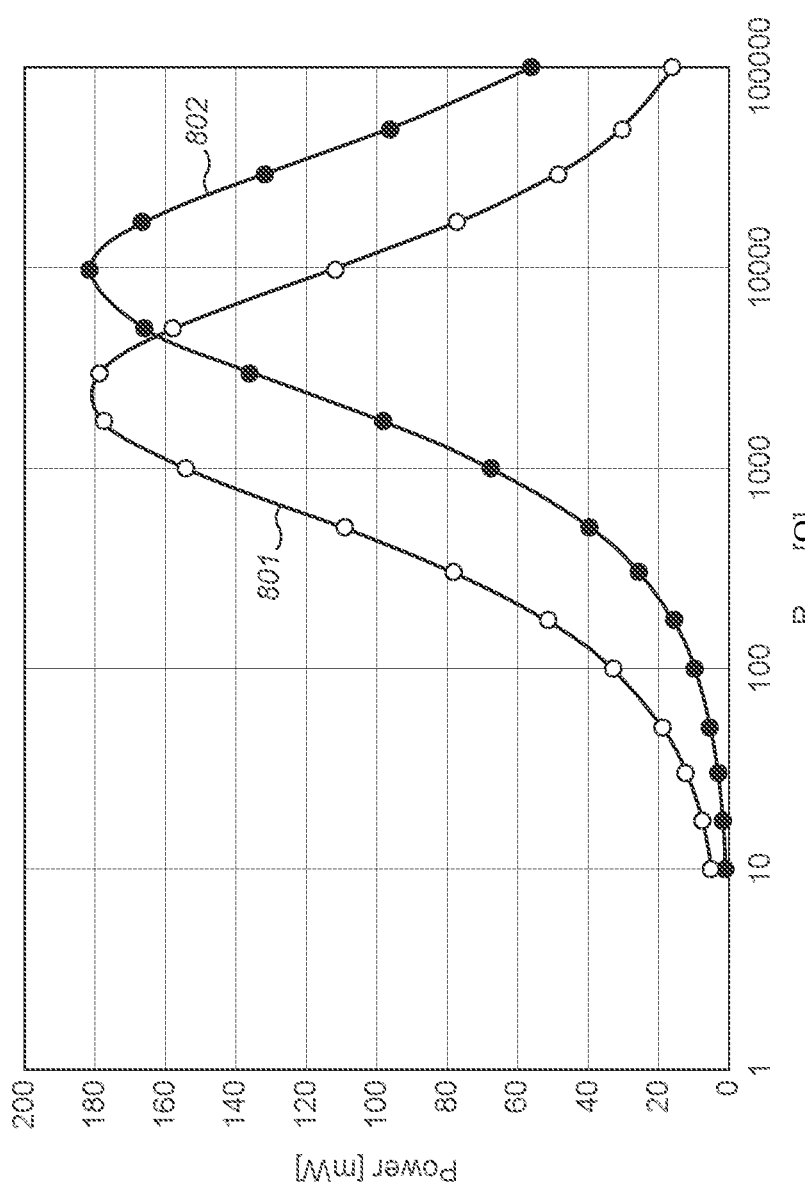
FIG. 8 is a graph illustrating power available to card circuitry for the smart card of FIG. 1 and the smart card of FIG. 2.

FIG. 8 is a graph illustrating the power available to card circuitry 204 vs. the resistance of the card circuitry for two different smart cards $R_{loads}$. Both smart cards were placed a fixed distance from a contactless power source. Curve 801 is for a smart card as shown in FIGS. 2 and 3. Curve 802 is for a smart card as shown in FIG. 1. This figure demonstrates that the peak power point has shifted from curve 802 to curve 801 to a lower card circuitry resistance by a factor of 4.

The step-down converter illustrated in FIG. 3, when operated as described above, reduces the voltage of the input power signal by a factor of 2. The step-down converter of FIG. 3 is also operable in a bypass mode in which it reduces the voltage of the input power signal by a factor of 1. In this mode, switches 304 and 305 are closed, thereby directly connecting Vin to Vout. Switch 307 is open. Switch 306 may be open or closed. Preferably, switch 306 is closed, thereby connecting the capacitor 302 to ground 303. This aids in decoupling capacitance.

More generally, a step-down converter may be used as the DC-DC converter 20-3 of FIG. 2 to reduce the voltage of the input power signal by any ratio. The step-down converter may be used to reduce the voltage of the input power signal by an integer factor. That integer factor may be a number greater than 2. The step-down converter may be used to reduce the voltage of the input power signal by a non-integer factor. For example, a fractional divider may be used which reduces the voltage of the input power signal by a factor of a/b, where a and b are integers and a>b.

The step-down converter may be operable in a plurality of modes, where each mode reduces the voltage of the input power signal by a different factor. For example, the step-down converter illustrated in FIG. 3 is operable in two modes: a first mode in which the voltage of the input power signal is reduced by a factor of 1, and a second mode in which the voltage of the input power signal is reduced by a factor of 2.

The step-down converter may be configured to dynamically change from one of its operating modes to another of its operating modes. In this case, the step-down converter may change between operating modes in response to a trigger.

That trigger may be related to voltage of the input power signal. For example, the step-down converter may be configured to change from a first mode to a second mode in response to the voltage of the input power signal changing such that it exceeds a first threshold voltage. Conversely, the step-down converter may be configured to change from the second mode to the first mode in response to the voltage of the input power signal changing such that it falls below a second threshold voltage. The first and second threshold voltages may be the same. Alternatively, the first threshold voltage may be higher than the second threshold voltage, so as to allow hysteresis in the operation of the step-down converter. In the example of a step-down converter having more than two operating modes, the step-down converter may store a plurality of threshold voltages, and be configured to respond to the voltage of the input power signal crossing each threshold voltage by changing to an operational mode associated with that threshold transition.

Figure 4:
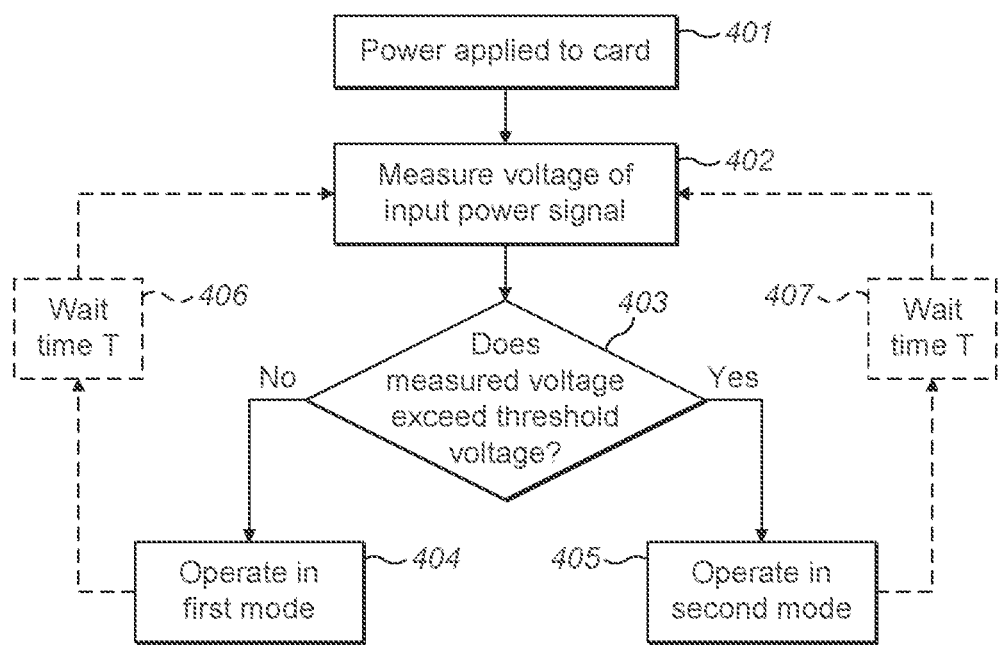
FIG. 4 is a flowchart illustrating changing modes of a step-down converter.

The step-down converter may dynamically change from one operational mode to another in response to the voltage of the input power signal as shown in the flowchart of FIG. 4. For ease of illustration, FIG. 4 illustrates the method for a two mode step-down converter in which the first and second threshold voltages are the same. At step 401, power is applied to the card by the card terminal. At step 402, the step-down converter measures the voltage of the input power signal. The step-down converter then compares the measured voltage to the threshold voltage at step 403. If the measured voltage does not exceed the threshold voltage, then the step-down converter moves to step 404 where it operates in a first mode. If the measured voltage does exceed the threshold voltage, then the step-down converter moves to step 405 where it operates in a second mode. The step-down converter reduces the voltage of the input power signal by a greater factor in the second mode than in the first mode.

The step-down converter may continue to operate in the mode selected in step 404 or 405 until the end of the current interaction with the card terminal, i.e. whilst it remains continually powered by the card terminal. Alternatively, as shown as an optional step 406/407 in FIG. 4, the step-down converter may wait a time T, and then re-perform steps 402 to 405. Thus, the step-down converter may periodically compare the voltage of the input power signal to the threshold voltage and change operating mode of the step-down converter if the voltage of the input power signal has crossed the threshold voltage.

The method of FIG. 4 describes measuring the voltage of the input power signal. Instead, the step-down converter may determine the voltage of the input power signal in another way. For example, the step-down converter may derive the voltage of the input power signal from measurement of another parameter of the input power signal such as the current. As another example, the step-down converter may be informed of the voltage of the input power signal from another source. For example, the card terminal may identify the voltage of the input power signal to the step-down converter.

The step-down converter is used to reduce the voltage applied to the card circuitry 204, and correspondingly increase the current applied to the card circuitry. This enables faster processing by the card circuitry. However, suitably, the step-down converter is also operable in a bypass mode in which it does not reduce the voltage of the input power signal. This is utilised when the voltage of the input power signal is too low such that a further reduction would be below the operating voltage of the card circuitry. For example, the step-down converter may be operable in a first mode in which it reduces the voltage of the input power signal by a factor of 2 when the voltage of the input power signal is greater than 2.5V. For example, when the voltage of the input power signal lies in the range 2.5V to 5.5V. The step-down converter may be operable in a second mode in which it reduces the voltage of the input power signal by a factor of 1 when the voltage of the input power signal is less than 2.5V. For example, when the voltage of the input power signal lies in the range 1.62V to 2.5V.

In another example, the trigger may be related to the sensitivity of the operations of the card circuitry to noise. Some noise is introduced into the output power signal as a result of the switching of the step-down converter when operating in a mode which reduces the voltage of the input power signal by a factor greater than 1. The card circuitry 204 may perform some operations which are particularly sensitive to noise, and others which are not. For example, card circuitry with biometric functionality may comprise a biometric sensor. Biometric sensors are particularly sensitive to noise whilst sensing biometric data, such as a fingerprint. Conversely, the processing of the sensed biometric data after it has been scanned is not as sensitive to noise. Thus, the step-down converter may be configured to dynamically change operation mode so as to: (i) operate in a bypass mode in which it does not reduce the voltage of the input power signal when the biometric sensor is sensing the biometric data; and (ii) operate in a different mode in which it does reduce the voltage of the input power signal when the biometric sensor is not sensing biometric data.

In another example, the trigger may be related to noise of the input power signal. For example, the step-down converter may measure the variance of the current/voltage of the input power signal, and if it is above a threshold variance operate the step-down converter in the bypass mode in which is does not reduce the voltage of the input power signal.

In another example, the trigger may be related to noise of the output power signal. For example, the step-down converter may measure the variance of the current/voltage of the output power signal, and if it is above a threshold variance operate the step-down converter in the bypass mode in which it does not reduce the voltage of the input power signal.

The step-down converter may be configured to dynamically change mode in response to each of several triggers. For example, it may change mode in response to both voltage triggers and noise triggers. It may have a priority order associated with the triggers. For example, if the voltage of the input power signal is high enough to trigger the step-down converter to operate in a mode in which it reduces the voltage of the input power signal by a factor of 2, but the card circuitry is performing a biometric scan, then the step-down converter may be configured to prioritise the noise trigger and operate in the bypass mode until the biometric scan has been completed. Once the biometric scan has been completed, both the noise trigger and voltage trigger would trigger the step-down converter to operate in the mode which reduces the voltage of the input power signal by a factor of 2, thus the step-down converter would change to this mode.

Figure 5:
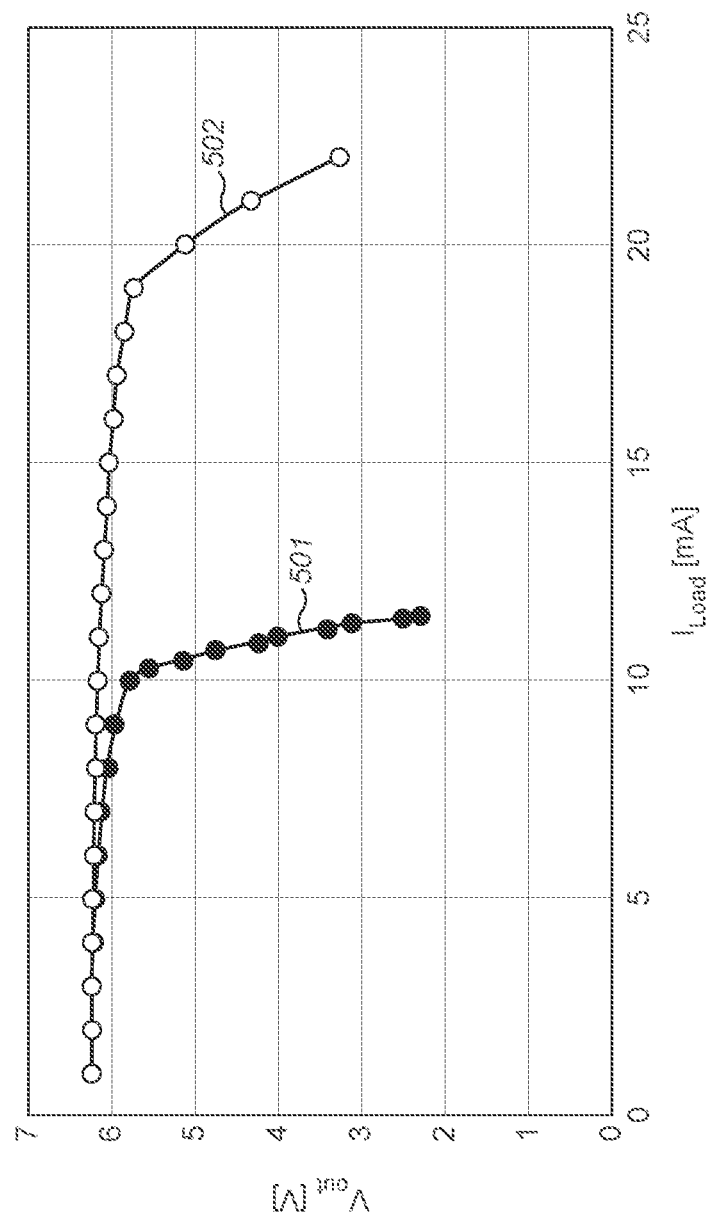
FIG. 5 is a graph illustrating the current available to card circuitry when the smart card uses the DC-DC converter of FIG. 2 compared to utilising a LDO regulator.

FIG. 5 is a graph illustrating data from two smart cards. The first smart card is as shown in FIG. 2. The second smart card is the same as shown in FIG. 2 except that the DC-DC converter is replaced with a low dropout regulator (LDO). Both smart cards were placed a fixed distance from a contactless power source. The graphs illustrate the currents drawn by the card circuitry for a given voltage of the output power signal. The output voltage was clamped at ~6V. Curve 501 is the current drawn with the LDO. The available current is ~10 mA. Curve 502 is the current drawn with the step-down converter. The available current is ~20 mA. Thus, using the step-down converter enables a much higher current to be provided to the card circuitry.

Contactless card systems are powered wirelessly. The power they harvest from the RF signal from the card terminal is fixed and finite for a given distance between the smart card and the card terminal. The contactless power transfer has a high Q which causes the input power signal to have a high voltage. The circuitry described herein utilises a step-down converter to translate that high voltage into an increased current to the card circuitry. This improves power efficiency thereby enabling faster digital processing to occur in the card circuitry components. It also enables components requiring higher operating currents to be utilised in the card circuitry. It also increases the operating distance of the smart card from the card terminal, since the required operating current of the card circuitry can be generated when the smart card is held further from the card terminal than when a step-down converter is not used.

FIG. 3 illustrates a capacitive network which has a single capacitor. Alternatively, the capacitive network may comprise a plurality of capacitors. The step-down converter of FIG. 3 is operable in two phases. Alternatively, the capacitive network may be switched in three or more phases.

Other types of step-down converter may be utilised as the DC-DC converter in FIG. 2. For example, step-down converters which comprise an inductive network rather than a capacitive network. An example of a step-down converter using an inductive network is a buck converter.

The DC-DC converter 203 of FIG. 2 may comprise a step-up converter. The step-up converter may be used to enable a constant voltage to be applied to the card circuitry 204 independent of the voltage of the input power signal. That input power signal may come from the inductive antenna 209 when the smart card is operating in a contactless mode. For a smart card which additionally, or alternatively, operates in a contact mode, the input power signal comes from the contact pads of the smart card which contact and receive power from the card terminal. The voltage of the input power signal may differ temporally dependent on how the card is powered. When powered by direct contact with the card terminal, the voltage input level may be 5V if Class A is being used, 3V if Class B is being used, or 1.8V if Class C is being used. When powered by a contactless connection with the card terminal, the voltage input level may differ dependent on how far the smart card is held from the card terminal. Thus, the DC-DC converter may incorporate a step-up converter to at times increase the voltage of the input power signal to the operating voltage of the card circuitry and/or at times (in addition to other circuitry of the DC-DC converter) decrease the voltage of the input power signal to the operating voltage of the card circuitry and/or at times neither increase nor decrease the voltage of the input power signal.

Figure 9:
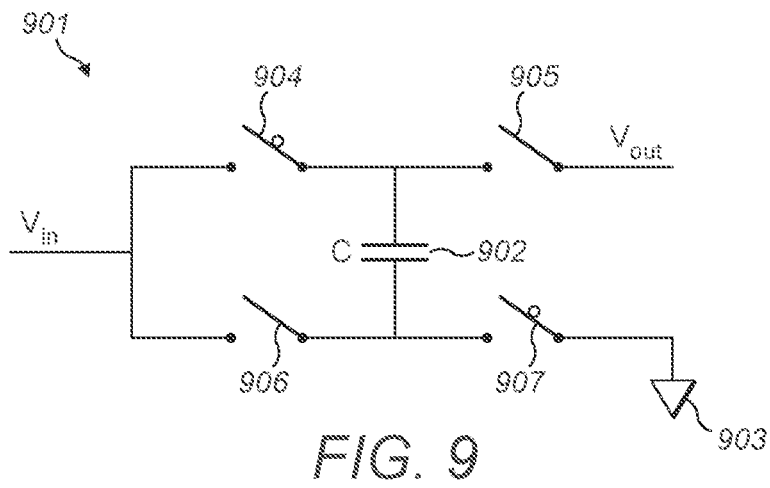
FIG. 9 illustrates an exemplary step-up converter.

FIG. 9 illustrates an exemplary step-up converter 901 which may be incorporated into the smart card 202 of FIG. 2 as the DC-DC converter 203. The Vin signal line on FIG. 9 is the input to DC-DC converter 203 on FIG. 2. The Vout signal line on FIG. 9 is the output of the DC-DC converter 203 shown on FIG. 2. The step-up converter 901 shown in FIG. 9 comprises a switched capacitive network operable in two phases. The capacitive network comprises capacitor 902 which is connected in series between Vout and ground 903, and is connected in parallel with Vin. The step-up converter comprises four switches. Two switches 904 and 905 are connected in series between Vin and Vout. The first of these switches 904 is connected between the capacitor 902 and Vin. The second of these switches 905 is connected between the capacitor 902 and Vout. Two further switches 906 and 907 are connected in series between Vin and ground 903. The first of these switches 906 is connected between Vin and the capacitor 902. The second of these switches 907 is connected between capacitor 902 and ground 903.

The two phases of the step-up converter are enabled utilising non-overlapping clock signals as follows. In the first phase, switches 904 and 907 are closed, and switches 905 and 906 are open. The capacitor 902 stores a charge during this first phase of CVin. In the second phase, switches 904 and 907 are open, and switches 905 and 906 are closed. In this second phase, the negative terminal of the capacitor 902 is switched from ground to the input voltage which charges the output to 2Vin. Once Vout is charged up to a steady state DC value, the following applies:

$$Vout = Vin + Vin \quad \text{(equation 10)}$$

$$Vout = 2Vin \quad \text{(equation 11)}$$

Thus, the step-up converter shown in FIG. 9 converts the input power signal at Vin to an output power signal at Vout which has twice the voltage and half the current.

The step-up converter illustrated in FIG. 9, when operated as described above, increases the voltage of the input power signal by a factor of 2. The step-up converter of FIG. 9 is also operable in a bypass mode in which it increases the voltage of the input power signal by a factor of 1. In this mode, switches 904 and 905 are closed, thereby directly connecting Vin to Vout. Switch 906 is open. Switch 907 may be open or closed. Preferably, switch 907 is closed, thereby connecting the capacitor 902 to ground 903. This aids in decoupling capacitance.

More generally, a step-up converter may be used to increase the voltage of the input power signal by any ratio. The step-up converter may be used to increase the voltage of the input power signal by an integer factor. That integer factor may be a number greater than 2. The step-up converter may be used to increase the voltage of the input power signal by a non-integer factor. For example, a fractional multiplier may be used which increases the voltage of the input power signal by a factor of a/b, where a and b are integers and a>b.

The step-up converter may be operable in a plurality of modes, where each mode increases the voltage of the input power signal by a different factor. For example, FIG. 10 illustrates a step-up converter operable in three modes: a first mode in which the voltage of the input power signal is increased by a factor of 1, a second mode in which the voltage of the input power signal is increased by a factor of 2, and a third mode in which the voltage of the input power signal is increased by a factor of 3.

Figure 10:
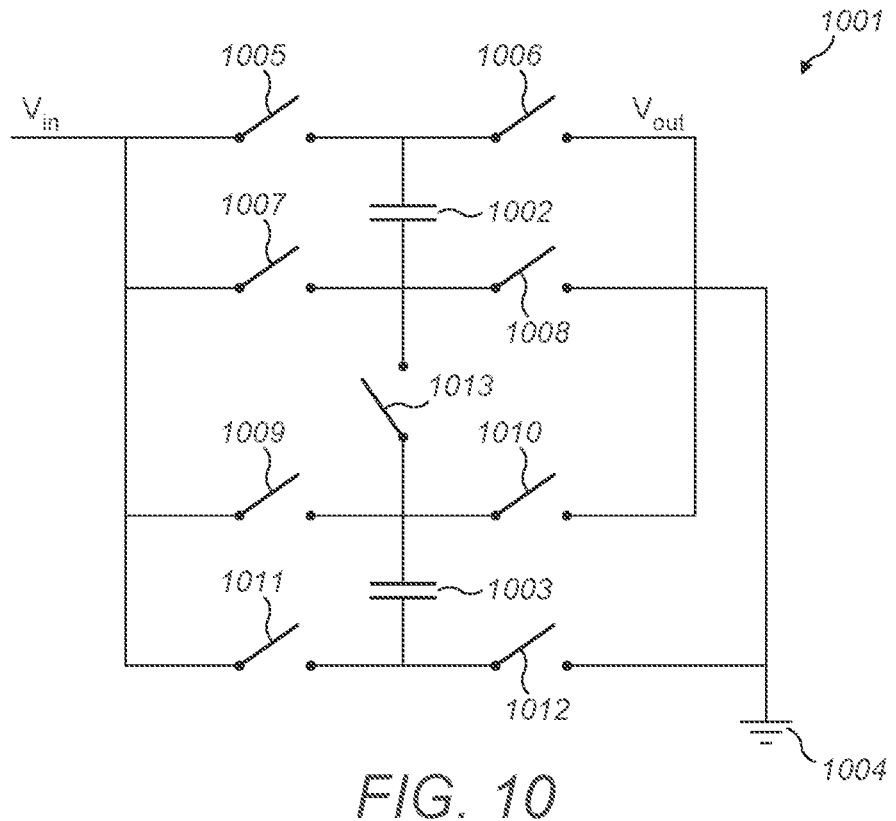
FIG. 10 illustrates an exemplary step-up converter operable in three modes.

The step-up converter 1001 of FIG. 10 may be incorporated into the smart card 202 of FIG. 2 as the DC-DC converter 203. The Vin signal line on FIG. 10 is the input to the DC-DC converter 203 on FIG. 2. The Vout signal line on FIG. 10 is the output of the DC-DC converter 203 shown on FIG. 2. The step-up converter 1001 shown in FIG. 10 comprises a switched capacitive network operable in three modes, each mode operable in two phases. The capacitive network comprises capacitors 1002 and 1003. Capacitors 1002 and 1003 are connected in series with each other interspersed by switch 1013. The step-up converter comprises nine switches. Two switches 1005 and 1006 are connected in series between Vin and Vout. The first of these switches 1005 is connected between Vin and the capacitor 1002. The second of these switches 1006 is connected between capacitor 1002 and Vout. Two further switches 1007 and 1008 are connected in series between Vin and ground 1004. The first of these switches 1007 is connected between Vin and the capacitor 1002, and is also connected between Vin and switch 1013. The second of these switches 1008 is connected between capacitor 1002 and ground 1004, and is also connected between switch 1013 and ground. Two further switches 1009 and 1010 are connected in series between Vin and Vout. The first of these switches 1009 is connected between Vin and capacitor 1003, and is also connected between Vin and switch 1013. The second of these switches 1010 is connected between capacitor 1003 and Vout, and is also connected between switch 1013 and Vout. Switches 1009 and 1010 are connected in parallel with switches 1005 and 1006. Two further switches 1011 and 1012 are connected in series between Vin and ground 1004. The first of these switches 1011 is connected between Vin and capacitor 1003. The second of these switches 1012 is connected between capacitor 1003 and ground 1004. Switches 1011 and 1012 are connected in parallel with switches 1007 and 1008.

In the first mode in which the step-up converter increases the voltage of the input power signal by a factor of 1, switches 1005 and 1006 are closed, thereby directly connected Vin to Vout. Switches 1007, 1009, 1011, 1010 and 1013 are open. Switches 1008 and 1012 may be open or closed. Preferably switches 1008 and 1012 are closed, thereby connecting capacitors 1002 and 1003 to ground 1004. This aids in decoupling capacitance. This mode may be considered to be a bypass mode.

In the second mode in which the step-up converter increases the voltage of the input power signal by a factor of 2, the step-up converter is operable in two phases. In the first phase, switches 1005, 1008, 1009 and 1012 are closed. The remaining switches are open. This causes capacitors 1002 and 1003 to be connected in parallel between Vin and ground 1004, and thereby charge up. In the second phase, switches 1006, 1007, 1010 and 1011 are closed. The remaining switches are open. This causes capacitors 1002 and 1003 to be connected in parallel between Vin and Vout.

In the third mode in which the step-up converter increases the voltage of the input power signal by a factor of 3, the step-up converter is operable in two phases. In the first phase, switches 1005, 1008, 1009 and 1012 are closed. The remaining switches are open. This causes capacitors 1002 and 1003 to be connected in parallel between Vin and ground 1004, and thereby charge up. In the second phase, switches 1006, 1013 and 1011 are closed. The remaining switches are open. This causes capacitors 1002 and 1003 to be connected in series between Vin and Vout.

The step-up converter may be configured to dynamically change from one of its operating modes to another of its operating modes. In this case, the step-up converter may change between operating modes in response to a trigger.

That trigger may be related to voltage of the input power signal. For example, the step-up converter may be configured to change from a second mode to a first mode in response to the voltage of the input power signal changing such that it exceeds a first threshold voltage. Conversely, the step-up converter may be configured to change from the first mode to the second mode in response to the voltage of the input power signal changing such that it falls below a second threshold voltage. The first and second threshold voltages may be the same. Alternatively, the first threshold voltage may be higher than the second threshold voltage, so as to allow hysteresis in the operation of the step-up converter. In the example of a step-up converter having more than two operating modes, the step-up converter may store a plurality of threshold voltages, and be configured to respond to the voltage of the input power signal crossing each threshold voltage by changing to an operational mode associated with that threshold transition.

Figure 11:
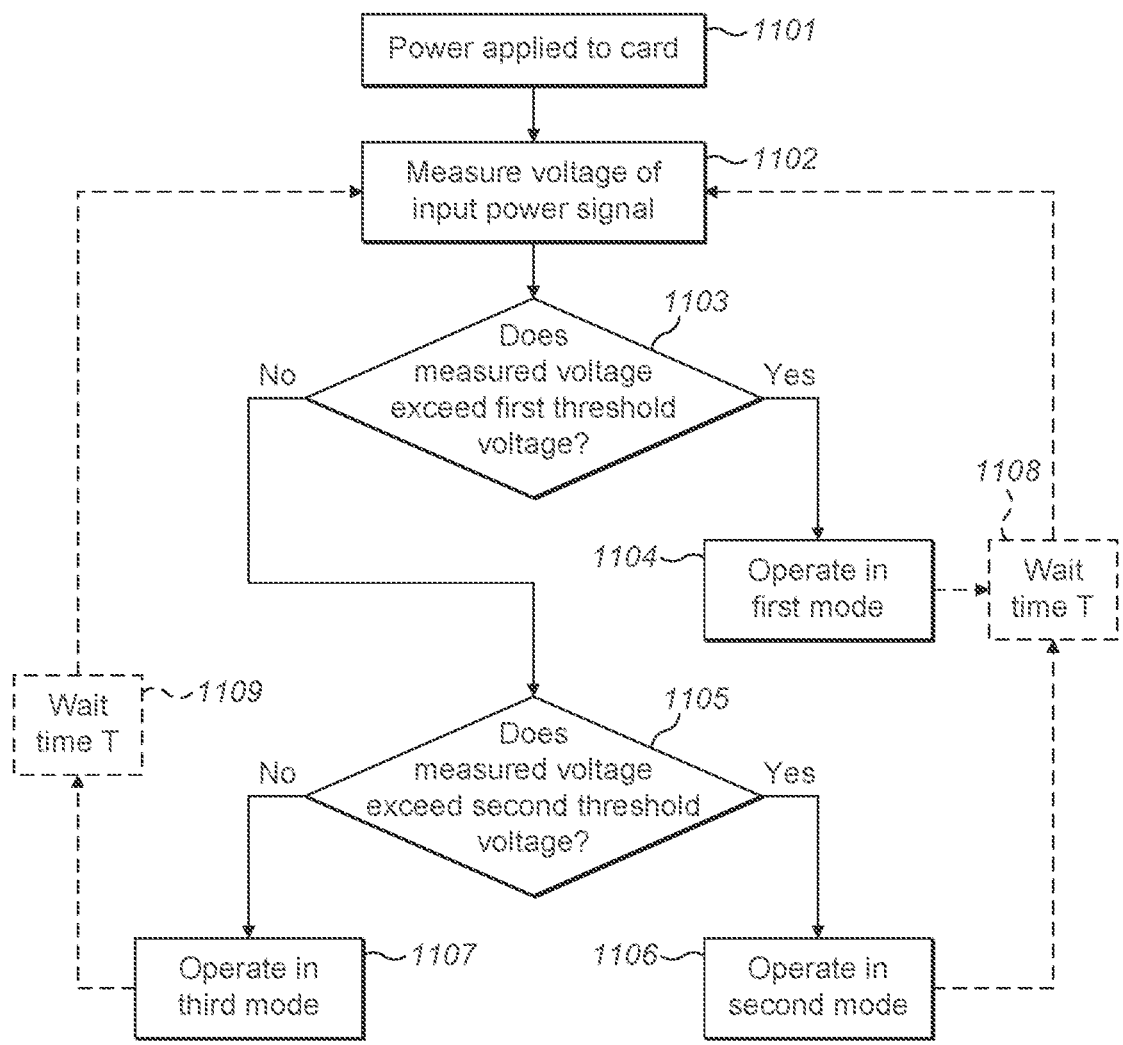
FIG. 11 is a flowchart illustrating changing modes of a step-up converter.

FIG. 11 is a flowchart illustrating how a step-up converter may dynamically change between three operational modes in response to the voltage of the input power signal. For ease of illustration, FIG. 11 illustrates a method for which the threshold voltage which triggers a change from the first to second mode is the same as the threshold voltage which triggers a change from the second to the first mode, and similarly with the transitions between the second and third modes. At step 1101, power is applied to the card by the card terminal. At step 1102, the step-up converter measures the voltage of the input power signal. The step-up converter then compares the measured voltage to a first threshold voltage at step 1103. If the measured voltage exceeds the first threshold voltage, then the step-up converter moves to step 1104 where it operates in a first mode. If the measured voltage does not exceed the first threshold voltage, then the method moves on to step 1105. At step 1105, the step-up converter compares the measured voltage to a second threshold voltage. If the measured voltage exceeds the second threshold voltage, then the step-up converter moves to step 1106 where it operates in a second mode. If the measured voltage does not exceed the second threshold voltage, then the step-up converter moves to step 1107 where it operates in a third mode. The step-up converter increases the voltage of the input power signal by a greater factor in the second mode than in the first mode, and by a greater factor in the third mode than in the second mode.

The step-up converter may continue to operate in the mode selected in step 1104, 1106 or 1107 until the end of the current interaction with the card terminal, i.e. whilst it remains continually powered by the card terminal. Alternatively, as shown as an optional step 1108/1109 in FIG. 11, the step-up converter may wait a time T, and then re-perform steps 1103 to 1107. Thus, the step-up converter may periodically compare the voltage of the input power signal to the threshold voltages and change operating mode of the step-up converter if the voltage of the input power signal has crossed one of the threshold voltages.

The method of FIG. 11 describes measuring the voltage of the input power signal. Instead, the step-up converter may determine the voltage of the input power signal in another way such as those described above with reference to the step-down converter of FIG. 3.

In another example, the trigger may be related to the type of input to the smart card. Specifically, the DC-DC converter may associate a respective mode for one, more or each of the following: (i) when the smart card is operating in a contactless mode in which the input power signal is received from the inductive antenna 209, (ii) when the smart card is operating in a contact mode, (iii) when the smart card is operating in a contact mode with a Class A input, (iv) when the smart card is operating in a contact mode with a Class B input, and (v) when the smart card is operating in a contact mode with a Class C input. The step-up converter may dynamically change operation mode in response to which of these input types it detects so as to match the operational mode to the input type.

In another example, the trigger may be related to the sensitivity of the operations of the card circuitry to noise. Some noise is introduced into the output power signal as a result of the switching of the step-up converter when operating in a mode which increases the voltage of the input power signal by a factor greater than 1. As per the discussion above with respect to the step-down converter, the card circuitry may perform some operations which are particularly sensitive to noise, and others which are not. Thus, the step-up converter may be configured to dynamically change operational mode so as to: (i) operate in a bypass mode in which it does not increase the voltage of the input power signal when the biometric sensor is sensing the biometric data; and (ii) operate in a different mode in which it does increase the voltage of the input power signal when the biometric sensor is not sensing biometric data.

In another example, the trigger may be related to noise of the input power signal. For example, the step-up converter may measure the variance of the current/voltage of the input power signal, and if it is above a threshold variance operate the step-up converter in the bypass mode in which is does not increase the voltage of the input power signal.

In another example, the trigger may be related to noise of the output power signal. For example, the step-up converter may measure the variance of the current/voltage of the output power signal, and if it is above a threshold variance operate the step-up converter in the bypass mode in which it does not increase the voltage of the input power signal.

The step-up converter may be configured to dynamically change mode in response to each of several triggers. For example, it may change mode in response to both voltage triggers and noise triggers. It may have a priority order associated with the triggers. For example, if the voltage of the input power signal is such as to trigger the step-up converter to operate in a mode in which it increases the voltage of the input power signal by a factor of 2, but the card circuitry is performing a biometric scan, then the step-up converter may be configured to prioritise the noise trigger and operate in the bypass mode until the biometric scan has been completed. Once the biometric scan has been completed, both the noise trigger and voltage trigger would trigger the step-up converter to operate in the mode which increases the voltage of the input power signal by a factor of 2, thus the step-up converter would change to this mode.

Figure 12:
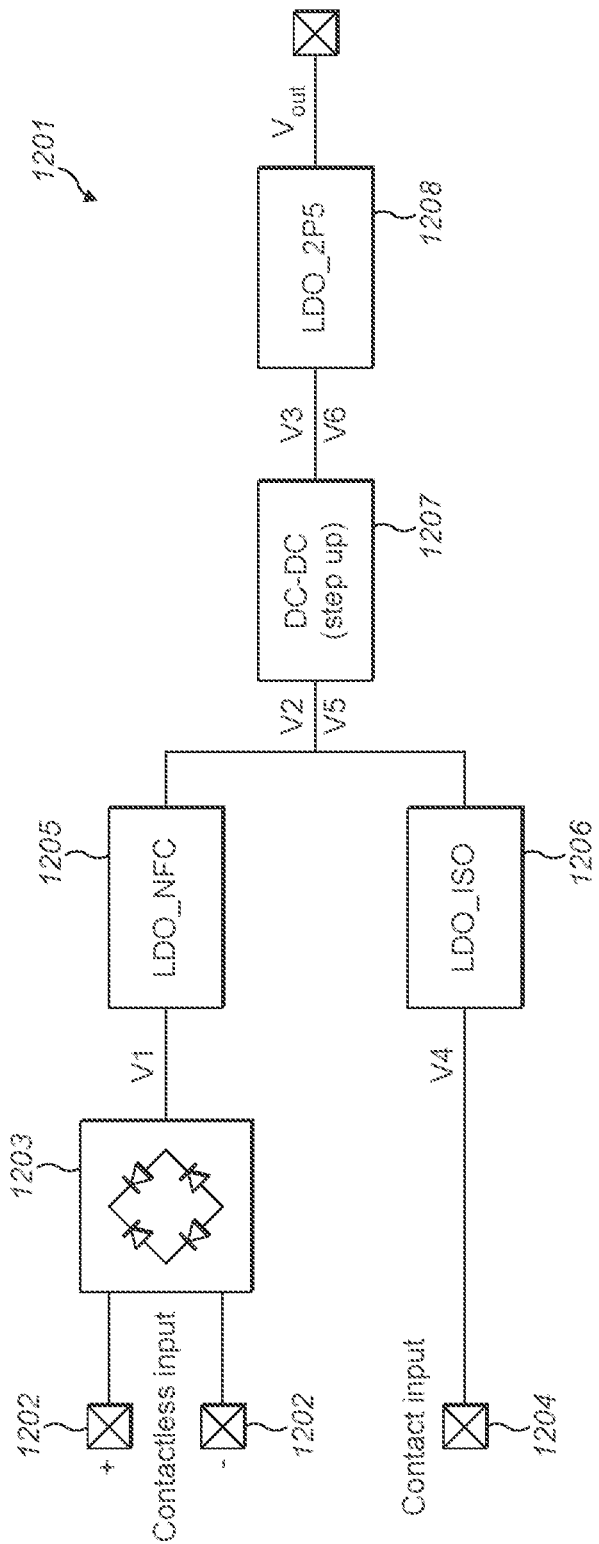
FIG. 12 illustrates a smart card which is operable in both contact and contactless modes and which incorporates a step-up converter.

FIG. 12 illustrates a smart card 1201 which is operable both in a contact mode and a contactless mode, and which utilises a step-up converter. Contactless input 1202 is the equivalent of the inductor 209 and capacitive network 210 of FIG. 2. Contactless input is connected to rectifier 1203. A rectifier is also incorporated into FIG. 2, but not illustrated. The smart card also comprises a contact input 1204. Contact input 1204 comprises a contact terminal which is configured to contact an equivalent contact of the card terminal, thereby providing a direct contact path for communications between the card circuitry 204 and the card terminal, and also providing a direct contact path for powering the smart card by the card terminal. The input of step-up converter 1207 is coupled to both the contactless input 1202 and the contact input 1204. The step-up converter 1207 is coupled to the contactless input 1202 via a voltage regulator 1205, such as an LDO regulator. Voltage regulator 1205 is connected directly to the input of step-up converter 1207. The step-up converter 1207 is coupled to the contact input 1204 via a voltage regulator 1206, such as a further LDO regulator. Voltage regulator 1206 is connected directly to the input of step-up converter 1207. The output of the step-up converter 1207 may be coupled to the card circuitry at Vout via a voltage regulator 1208, such as a further LDO regulator. Each of the voltage regulators 1205, 1206 and 1208 reduces the voltage of the signal input to it, and outputs a signal with a reduced voltage.

The DC-DC converter 203 as a whole may comprise both a step-up converter 1207 and also any combination of the voltage regulators 1205, 1206 and 1208. This enables the DC-DC converter 203 to output a signal to the card circuitry having a voltage which matches the operating voltage of the card circuitry regardless of the voltage of the signal input to the DC-DC converter from either the contactless input 1202 or the contact input 1204. For example, in a contactless mode of operation, the signal output from the rectifier 1203 has a voltage V1 which is high, for example 4V. This signal is input to voltage regulator 1205 which reduces the voltage so as to output a signal having a voltage V2 of, for example, 2.9V. The step-up converter 1207 may be set in the bypass mode in which it increases the voltage of the input signal by a factor of 1, thereby outputting a signal having a voltage V3 of 2.9V. The next voltage regulator 1208 then regulates the voltage down to 2.5V which is the operating voltage of the card circuitry 204 connected to Vout. Then, when the smart card switches to a contact mode of operation, the signal from the contact input 1204 may have a low voltage V4 of 1.8V. This signal is input to voltage regulator 1206 which reduces the voltage so as to output a signal having a voltage V5 of 1.7V. The step-up converter 1207 may be set to the second mode in which it increases the voltage of the input signal by a factor of 2, thereby outputting a signal having a voltage V6 of 3.4V. The next voltage regulator 1208 then regulates the voltage down to 2.5V which is the operating voltage of the card circuitry 204 connected to Vout.

Thus, the step-up converter is used in one instance as part of a DC-DC converter which increases the voltage input to the smart card up to the operating voltage of the card circuitry 204, and the step-up converter is used in another instance as part of a DC-DC converter which decreases the voltage input to the smart card down to the operating voltage of the card circuitry 204. Thus, the circuitry of FIG. 12 enables the smart card to present a constant voltage to the card circuitry 204 regardless of the type of input (contact or contactless) and the voltage of that input.

The use of a step-up converter in the smart card enables a greater range of component integrated circuits to be incorporated into card circuitry 204. Component integrated circuits vary in terms of their operating ranges, and specifically their operating voltages/currents. The circuitry shown in FIG. 12 enables all three contact classes A, B and C to be supported by the smart card along with contactless communications. Thus, if the input type is Class C (1.8V) but a component integrated circuit was only compatible with a Class A (5V) or Class B (3V) input, the smart card can use the step-up converter to provide the component integrated circuit with the operating voltage it needs even though that is higher than what is provided at the contact terminal. Thus, the entire system is Class C compatible, even though an individual component integrated circuit of the card circuitry 204 is not. Thus, use of the step-up converter eases system integration by not requiring all component integrated circuits of the card circuitry 204 to have the same operating ranges.

The use of a step-up converter in the smart card enables the output voltage to be optimised for the specific use of the card circuitry 204 at that time. For example, a high output voltage may be desired when the card circuitry 204 is being used for biometric sensing. At this time, a higher voltage enables a higher signal amplitude to be achieved for a biometric scan such as sensing a fingerprint. Thus, a high output voltage improves the SNR of the biometric data sensed.

As mentioned above, the mode of the step-up converter, and hence the voltage of the output power signal to the card circuitry can be chosen to optimise for a specific parameter. The parameter which is being optimised may be dynamically changed over time.

The step-up converter also enables a higher voltage to be supplied to the card circuitry than is supplied at the input to the smart card. This may be used to power additional component integrated circuits and/or external sensors of the card circuitry.

FIG. 10 illustrates a capacitive network which has two capacitors. Alternatively, the capacitive network may comprise a single capacitor or more than two capacitors. The step-up converter of FIG. 10 is operable in two phases. Alternatively, the capacitive network may be switched in three or more phases.

Other types of step-up converter may be utilised. For example, step-up converters which comprise an inductive network rather than a capacitive network. An example of a step-up converter using an inductive network is a boost converter.

The DC-DC converter 203 of FIG. 2 may comprise an inverting converter. The inverting converter may be used to generate an output power signal to the card circuitry which has a voltage below ground. This is particularly useful for a smart card which has card circuitry comprising an active sensor substrate. Generally, active sensor substrates require larger voltage ranges than passive sensor substrates. Use of an inverting converter enables the required voltage range to be provided spanning positive and negative voltages. For example, a 7.5V range can be provided as −5V to +2.5V. Additionally, some active sensor substrates require a negative voltage supply.

Active sensor substrates have thin film transistors (TFTs) available to use on the sensor itself. This allows circuitry to be incorporated onto the sensor which would otherwise form part of the ASIC of the card circuitry. For example, the receiver multiplexer (MUX) may be incorporated onto an active sensor substrate whereas on a passive substrate the receiver MUX is on the ASIC. This greatly reduces the number of input/output pads (10) required on the ASIC supporting the active sensor substrate compared to an ASIC supporting a passive sensor substrate because every output of the receiver MUX on the ASIC supporting a passive sensor substrate requires a unique 10. Incorporating the receiver MUX into the active sensor substrate means these 10 are not required at all on the ASIC. Further circuits, such as level shifters and digital logic may also be incorporated onto the sensor which would otherwise form part of the ASIC of the card circuitry.

Figure 13A:
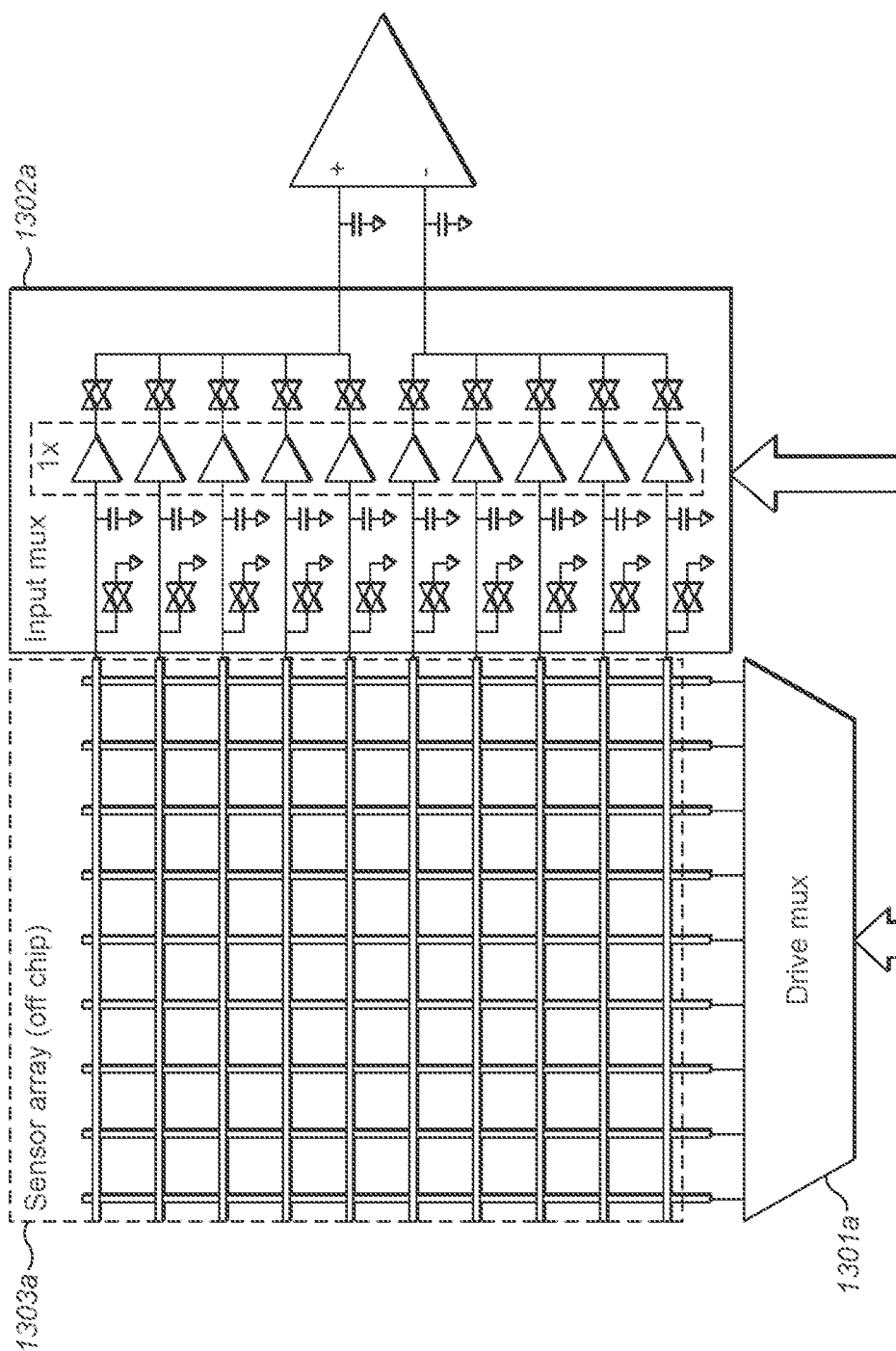
FIG. 13a illustrates a passive sensor substrate.
Figure 13B:
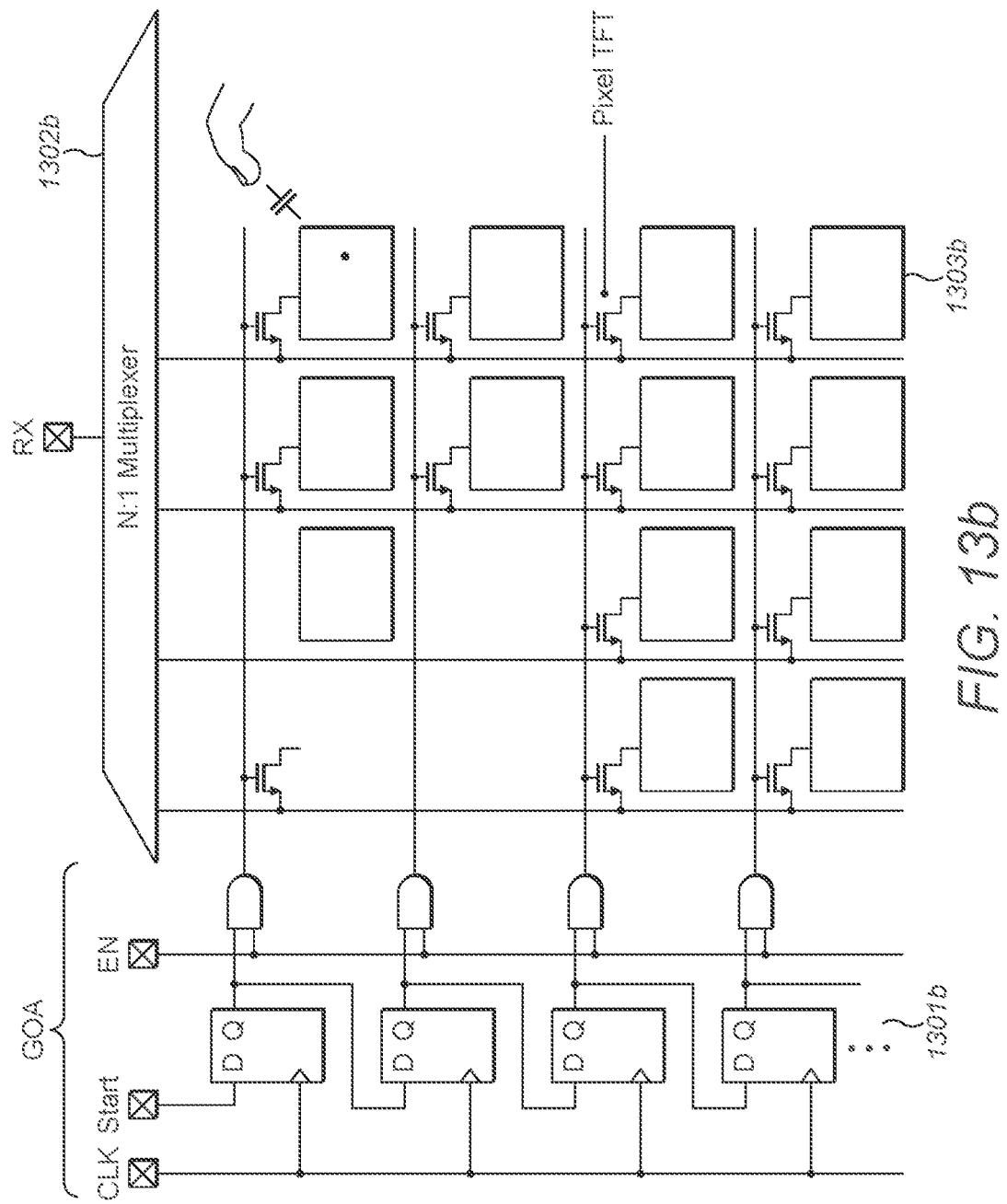
FIG. 13b illustrates an active sensor substrate.

FIG. 13a illustrates example card circuitry comprising a passive sensor substrate used for fingerprint sensing. In this circuitry, the drive multiplexer 1301a and input multiplexer 1302a are separate components to the passive sensor substrate 1303a. Overlaps of the rows and columns of the sensor form capacitors which are modulated by the finder. Conversely, FIG. 13b illustrates a corresponding active sensor substrate used for fingerprint sensing. Here, the drive circuitry 1301b and receiver multiplexer 1302b are on the sensor substrate along with the sensor 1303b itself.

Larger voltages, and sometimes negative voltages may be needed for active sensor technologies. An example operating voltage range which may be required for a biometric sensing operation is 7.5V. This may span from +2.5V to −5V, for example if pfet devices are used in the sensor. Alternatively, it may span from +5V to −2.5V if nfet devices are used in the sensor.

A step-up converter in combination with a level shifter could be used to generate the operating voltage range of 7.5V of the active biometric sensor substrate. However to do so would use transmission of a high power signal from the biometric ASIC to the biometric sensor substrate for sensing the biometric data, and a more complicated level shifter design.

Figure 14:
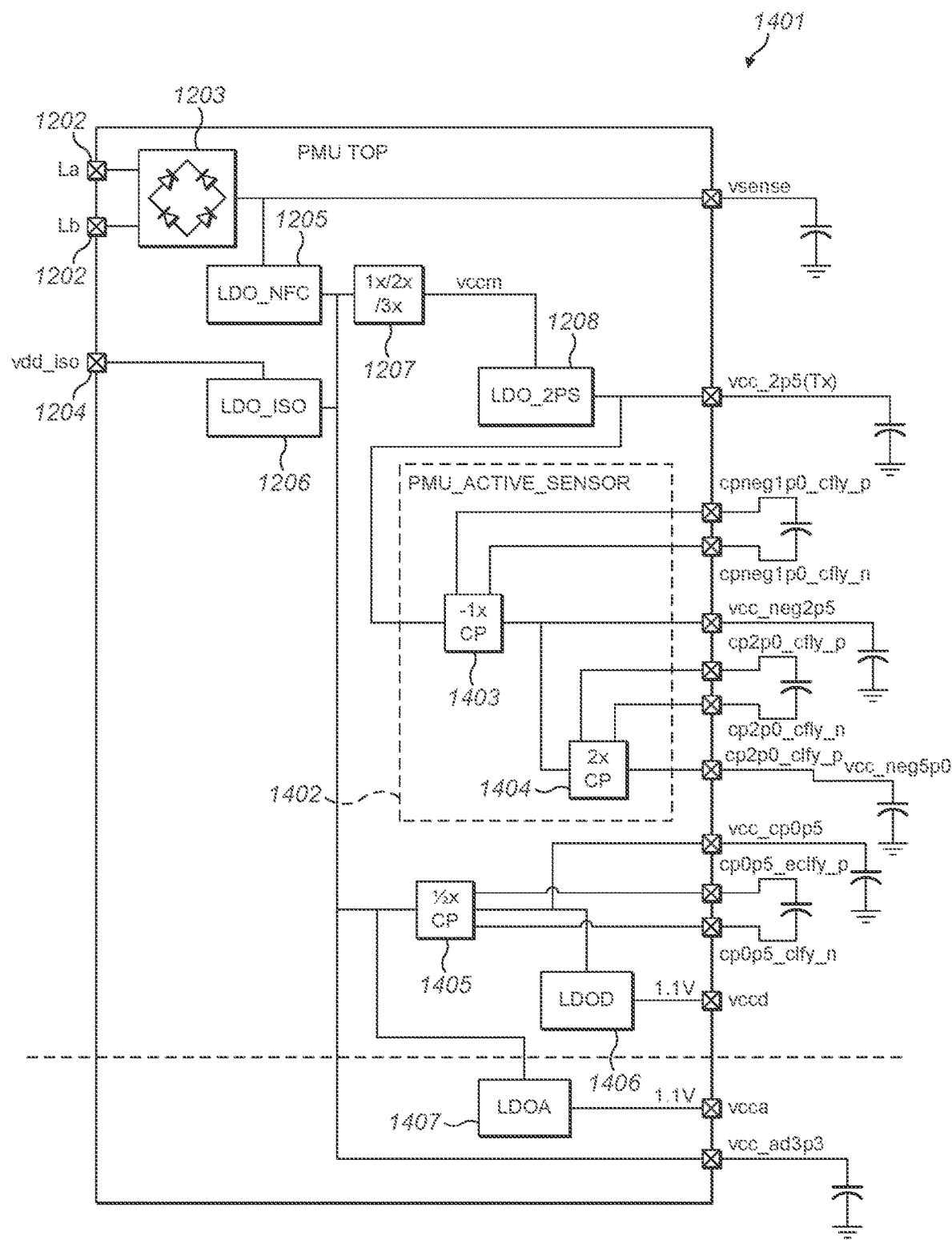
FIG. 14 illustrates a smart card comprising a DC-DC converter which comprises a step-down converter, a step-up converter and an inverting converter.

FIG. 14 illustrates a smart card 1401 comprising a DC-DC converter which comprises a step-down converter, step-up converter and an inverting converter. In this particular example, the smart card generates a voltage range of +2.5V to −5V as described in the following. However, it will be understood that the circuitry could be implemented to generate a different voltage range.

The smart card is operable in both a contact mode and a contactless mode of operation. The circuitry components 1202, 1203, 1204, 1205, 1206, 1207 and 1208 are as described with respect to FIG. 12. Thus, the voltage regulator 1208 may output a signal having a voltage of 2.5V as described above with respect to FIG. 12. Thus, the output of the voltage regulator 1208 provides the +2.5V signal of the +2.5V to −5V operating voltage range to output to the card circuitry.

The output of voltage regulator 1208 is also input to inverting converter 1402. Inverting converter 1402 comprises two capacitive charge pumps 1403 and 1404. Each of these capacitive charge pumps may comprise switched capacitive networks operable in phases to convert the voltage of the signal input to them to an output signal having a different voltage. The first capacitive charge pump 1403 inverts the voltage of the signal input to it. Thus, it converts the +2.5V input signal to a −2.5V output signal. The output of the first capacitive charge pump 1403 is input to the second capacitive charge pump 1404. The second capacitive charge pump 1404 increases the voltage of the signal input to by a factor of 2. Thus, it converts the −2.5V input signal to a −5V output signal. The output of the second capacitive charge pump 1404 is the output of the inverting converter 1402. This output provides the −5V signal of the +2.5V to −5V operating voltage range to output to the card circuitry.

Thus, the use of the inverting converter in the smart card of FIG. 14 enables a negative voltage to be generated without requiring level shifting. This applies to both contact and contactless smart cards. The inverting converter thereby enables the use of active substrate technologies as part of the card circuitry 204. This is particularly useful for card circuitry including biometric sensors such as fingerprint sensors.

The inverting converter of FIG. 14 utilises two charge pumps to generate an output signal have a voltage which is a factor of −2 times the voltage of the signal input to it. It will be appreciated that in other examples, the inverting converter may utilise a single charge pump or greater than two charge pumps. The factors by which the charge pumps multiply the voltage is similarly implementation specific. The common requirement of the inverting converter is that it outputs a signal having a negative voltage by means of incorporating a charge pump which inverts the voltage of the signal applied to it.

The smart card further comprises step-down converter 1405. The step-down converter receives an input power signal from either the contact input 1204 or the contactless input 1202 via voltage regulator 1205/1206. The step-down converter may operate as described herein to reduce the voltage of the input power signal to an output power signal for sending to the card circuitry. For example, FIG. 14 illustrates the step-down converter generating an output signal having a voltage of 1.1V. A voltage regulator 1406 may be connected between the output of the step-down converter and the card circuitry as shown in FIG. 14. That voltage regulator may further decrease the voltage of the signal output from the step-down converter in order to match the operating voltage of the card circuitry.

The smart card of FIG. 14 illustrates a further voltage regulator 1407, which is connected between the contact 1204 and contactless inputs 1202 and the output to the card circuitry via voltage regulators 1205/1206. This enables the smart card to operate in a mode in which it bypasses all of the step-up converter, step-down converter and inverting converter, and passes the signal received by the smart card from either the contact or contactless inputs 1202/1204 to the card circuitry 204 with its voltage only moderated by voltage regulators 1205 or 1206 and 1407.

FIG. 14 illustrates a smart card having a DC-DC converter incorporating a step-down converter, a step-up converter and an inverting converter. More generally, the smart card may incorporate any one or combination of: one or more step-down converter, one or more step-up converter and one or more inverting converter.

FIG. 14 illustrates a voltage regulator connected to the input of each of the step-up converter, step-down converter and inverting converter, and a voltage regulator connected to the output of the step-up converter and step-down converter. More generally, when the smart card DC-DC converter comprises any single one or combination of a step-down converter, step-up converter and inverting converter, the DC-DC converter may also comprise a voltage regulator connected between the smart card input (contact or contactless) and any one of the individual step-down, step-up and inverting converters. Similarly, the DC-DC converter may also comprise a voltage regulator connected between any one of the individual step-down, step-up and inverting converters and the output to the card circuitry 204.

There are many different types of card circuitry which may be incorporated onto the smart card. Even the same type of card circuitry, for example Secure Elements for providing the communication circuitry, differ in terms of their power requirements, for example due to differences in their memory and processing capabilities. Thus, the capacitance value C2 and the factor by which the voltage of the input power signal is changed by the DC-DC converter are specific to the card circuitry in question.

Figure 15:
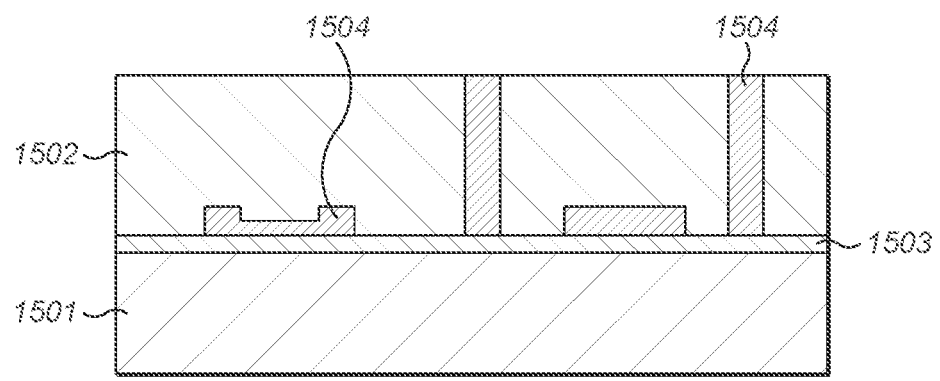
FIG. 15 illustrates a smart card comprising plastic layers sandwiching an inlay.

Each smart card described herein may have a layered structure. As shown in FIG. 15, this layered structure may comprise one or more lower layers of card material 1501 (for example plastic) and one or more upper layers of card material 1502 (for example plastic). The upper and lower layers of card material sandwich one or more inlays 1503. In the case that there are a plurality of inlays 1503, those inlays are electrically connected to each other. The circuitry components 1504 described herein are distributed amongst the inlay(s) and/or the card material layers.

The inlay(s) has a size and shape which is less than or equal to a conventional smart card. For example, the inlay(s) has a size and shape that is less than the physical dimensions set out in the ISO 7810 standard for an ID-1 card. For example, the inlay(s) may have a thickness of 0.2-0.3 mm. The base of the inlay(s) may be composed of a flexible plastic such as PVC, PC, PET-T or Teslin®. Referring to the example of FIG. 2, the following circuitry components are mounted onto the inlay(s): inductive antenna 209, capacitive network 210 and DC-DC converter 203.

These circuitry components are mounted onto the inlay(s) prior to sandwiching the inlay(s) between the plastic layers 1501, 1502. Once the inlay(s) has been arranged between the plastic layers 1501, 1502, a hot lamination process may then be used to fuse the inlay(s) between the plastic layers 1501, 1502. Hot lamination uses heat and pressure to cause the layers to bond together.

The card circuitry 204 may also be mounted onto the inlay(s) prior to sandwiching the inlay(s) between the plastic layers 1501, 1502. In this case, the card circuitry 204 is present during the hot lamination process along with the other circuitry components. This is a suitable method for card circuitry 204 which is not damaged by heat and/or pressure.

Figure 16:
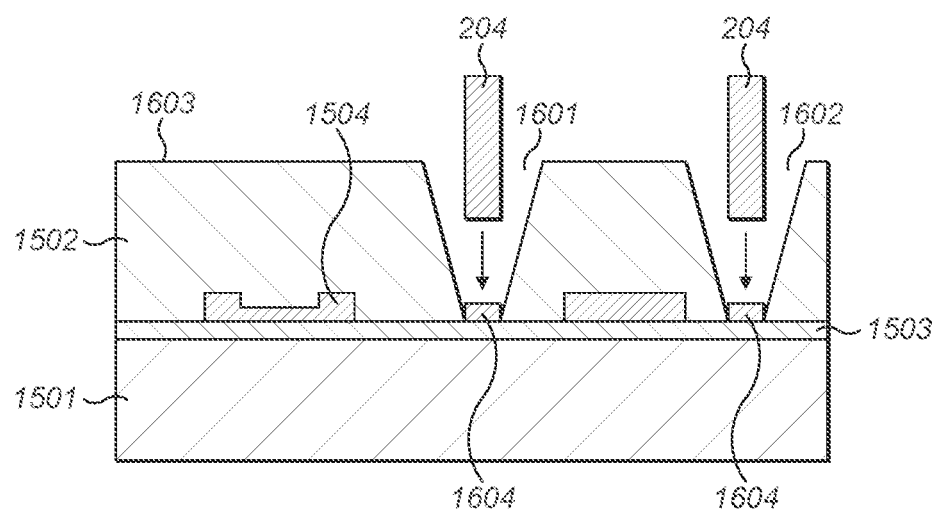
FIG. 16 illustrates a method of applying circuitry components to cavities in a pre-formed card.

Alternatively, card circuitry 204 may not be mounted to the inlay(s) prior to the hot lamination process. Instead, the inlay(s) comprise only the circuitry components described above. Contact points for the card circuitry 204 are added to the inlay(s) at appropriate points for subsequent connection to the card circuitry 204. The inlay(s) are sandwiched between the plastic layers 1501, 1502, and a hot lamination process is used to bond the layers together. At this point, the card circuitry 204 is not part of the structure. Following the hot lamination process, one or more cavities 1601, 1602 are made in the upper surface of the card 1603 which extend down to the contact points 1604 on the inlay(s). The cavities may be formed by, for example, milling or etching. The card circuitry 204 is then placed into its cavity (as illustrated by the arrows in FIG. 16 and electrically connected to the contact points on the inlay(s), for example using conductive adhesive, wire bonds, copper pads etc. The electrical circuit on the inlay(s) is thereby completed. The card circuitry 204 may then be secured into the card, for example using adhesive and/or by applying a layer of sealant or card material between the top of the card circuitry 204 and the surface of the card 1603. This is a suitable method for card circuitry 204 which is damaged by the heat and/or pressure applied during hot lamination.

In a further alternative, some component parts of the card circuitry 204 may be mounted to the inlay(s) prior to the hot lamination process, and other component parts added after hot lamination. For example, those components which are resistant to the heat and pressure applied during hot lamination may be mounted to the inlay(s) prior to hot lamination, whereas those components which may be damaged by the heat and/or pressure applied during hot lamination may be added to the card after the hot lamination process using the cavity method described above. In the example described herein in which the card circuitry has biometric functionality, a biometric controller (which is resistant to the heat and pressure of hot lamination) may be mounted to the inlay(s) prior to hot lamination, whereas the biometric sensor (which is sensitive to the heat and pressure of hot lamination) may be added to the card later. The biometric sensor is added in a cavity formed in the card, as described above.

Although hot lamination has been described above, other methods of fusing the plastic layers and inlay(s) together may be used. For example, a cold lamination process may be used.

By matching the impedances of the card terminal to the card circuitry as described herein, signal reflection is greatly reduced, and hence power transfer to the card circuitry is much more efficient. An increase in efficiency of up to 50% is achieved. This enables the smart card to derive sufficient power from the card terminal to operate the card circuitry when the smart card is held further from the landing plane of the card terminal. For a smart card that previously had to be held at 2 cm from the landing plane for it to be sufficiently powered, a 50% increase in power transfer efficiency means that it can be held at 4 cm from the landing plane and be sufficiently powered to operate. Thus, the circuitry described herein increases the usability of contactless smart cards and dual interface smart cards operating in a contactless mode.

Further components may be included in the circuits described herein. For example, a voltage regulator may be included in the smart card, that voltage regulator having an output connected to the input of the DC-DC converter. For example, a LDO may be connected to the input of the DC-DC converter in any of the examples described. This voltage regulator is used to limit the maximum voltage of the input power signal to the DC-DC converter. Where the smart card is capable of both contact and contactless connection to the card terminal, the voltage regulator in this position also aids isolation between the inductive antenna and the contact terminal of the card (which provides the contact connection to the card terminal).

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A smart card inlay comprising:
a card circuitry;
a capacitor having a first portion and a second portion;
an inductive antenna configured to (i) communicate wirelessly with a card terminal, and (ii) power the card circuitry via inductive coupling to the card terminal; and
a DC-DC converter having an input coupled to the inductive antenna and an output connectable to the card circuitry, wherein
the DC-DC converter is configured to receive an input power signal from the inductive antenna and convert the input power signal into an output power signal provided to the card circuitry,
the output power signal matches an operating current and/or operating voltage of the card circuitry, and
the DC-DC converter and the card circuitry are connected in series between the first portion and the second portion of the capacitor.

2. The smart card inlay as claimed in claim 1, wherein the DC-DC converter comprises a switched capacitive network operable in phases.

3. The smart card inlay as claimed in claim 1, wherein the DC-DC converter is configured to reduce voltage of the input power signal to the operating voltage of the card circuitry using a step-down converter.

4. The smart card inlay as claimed in claim 3, wherein the step-down converter is configured to reduce the voltage of the input power signal by an integer factor.

5. The smart card inlay as claimed in claim 3, wherein the step-down converter has a plurality of modes, each mode reducing the voltage of the input power signal by a different factor.

6. The smart card inlay as claimed in claim 5, wherein the step-down converter is operable in a first mode which reduces the voltage of the input power signal by a factor of 1, and a second mode which reduces the voltage of the input power signal by a factor of 2.

7. The smart card inlay as claimed in claim 5, wherein the step-down converter is configured to dynamically change from one mode of the plurality of modes to another mode of the plurality of modes.

8. The smart card inlay as claimed in claim 7, wherein the step-down converter is configured to dynamically change its mode in response to a change in the voltage of the input power signal.

9. The smart card inlay as claimed in claim 8, wherein the step-down converter is configured to:
measure the voltage of the input power signal;
compare the measured voltage to a threshold voltage;
if the measured voltage does not exceed the threshold voltage, operate in a first mode; and
if the measured voltage does exceed the threshold voltage, operate in a second mode, wherein the voltage of the input power signal is reduced by a greater factor in the second mode than in the first mode.

10. The smart card inlay as claimed in claim 7, wherein the step-down converter is configured to dynamically change its mode in response to sensitivity of current operations of the card circuitry to noise.

11. The smart card inlay as claimed in claim 1, wherein the DC-DC converter is coupled to the inductive antenna via a voltage regulator.

12. The smart card inlay as claimed in claim 1, wherein the capacitor is connected in parallel with the inductive antenna, and
the capacitor is connected in parallel with the card circuitry,
the inductive antenna and the capacitor are configured to form a power coupling circuit having a resonant frequency aligned with the card terminal's driving signal resonant frequency.

13. The smart card inlay as claimed in claim 12, wherein the card terminal's driving signal resonant frequency is specified by the contactless integrated circuit card specification ISO/IEC 14443.

14. The smart card inlay as claimed in claim 12, wherein impedance of the card terminal as reduced by the DC-DC converter and the capacitor matches impedance of the card circuitry.

15. The smart card inlay as claimed in claim 1, wherein the card circuitry is configured to communicate wirelessly with the card terminal via the inductive antenna.

16. The smart card inlay as claimed in claim 1, wherein the card circuitry comprises a biometric sensor configured to sense biometric data of a user.

17. The smart card inlay as claimed in claim 16, wherein the card circuitry further comprises a biometric processor configured to perform a biometric verification process to verify identity of the user from the sensed biometric data.

18. The smart card inlay as claimed in claim 1, comprising a plurality of inlay segments, wherein
the inductive antenna and capacitive network are distributed across the plurality of inlay segments.

19. A smart card comprising the smart card inlay of claim 1.

20. The smart card inlay as claimed in claim 1, wherein the DC-DC converter is configured to change voltage of the input power signal to the operating voltage of the card circuitry using a step-up converter.

21. The smart card inlay as claimed in claim 20, wherein the DC-DC converter is configured to increase the voltage of the input power signal to the operating voltage of the card circuitry using the step-up converter.

22. The smart card inlay as claimed in claim 21, wherein the step-up converter is configured to increase the voltage of the input power signal by an integer factor.

23. The smart card inlay as claimed in 20, wherein
the DC-DC converter further comprises a voltage regulator connected to an output of the step-up converter, and
the voltage regulator is configured to reduce the output of the step-up converter to the operating voltage of the card circuitry.

24. The smart card inlay as claimed in claim 20, wherein the DC-DC converter has a further input couplable to a contact terminal,
the contact terminal is configured to communicate with the card terminal and power the card circuitry, and
the DC-DC converter is configured to receive an input power signal from the card terminal.

25. The smart card inlay as claimed in claim 24, wherein the step-up converter is configured to dynamically change its mode in response to whether the input power signal is received from the contact terminal or the inductive antenna.

26. The smart card inlay as claimed in claim 24, wherein the DC-DC converter is couplable to the contact terminal via a voltage regulator.

27. A smart card comprising:
a contact terminal, and
the smart card inlay of claim 24.

28. The smart card inlay as claimed in claim 1, wherein the DC-DC converter is configured to change a voltage of the input power signal to the operating voltage of the card circuitry using an inverting converter.

29. The smart card inlay as claimed in claim 28, wherein the card circuitry comprises an active biometric sensor configured to sense biometric data of a user.

30. The smart card inlay as claimed in claim 1, wherein the DC-DC converter comprises a step-down converter and a step-up converter.

31. The smart card inlay as claimed in claim 1, wherein the DC-DC converter comprises a step-down converter, a step-up converter, and an inverting converter.

32. A smart card inlay comprising:
an inductive antenna configured to (i) communicate wirelessly with a card terminal, and (ii) power a card circuitry via inductive coupling to the card terminal; and
a DC-DC converter having an input coupled to the inductive antenna and an output connectable to the card circuitry, wherein
the DC-DC converter is configured to receive an input power signal from the inductive antenna and convert the input power signal into an output power signal provided to the card circuitry,
the output power signal matches an operating current and/or operating voltage of the card circuitry,
the DC-DC converter is configured to change a voltage of the input power signal to the operating voltage of the card circuitry using a step-up converter, and
the step-up converter has a plurality of modes, each mode increasing the voltage of the input power signal by a different factor.

33. The smart card inlay as claimed in claim 32, wherein the step-up converter is operable in a first mode which increases the voltage of the input power signal by a factor of 1, a second mode which increases the voltage of the input power signal by a factor of 2, and a third mode which increases the voltage of the input power signal by a factor of 3.

34. The smart card inlay as claimed in claim 32, wherein the step-up converter is configured to dynamically change from one mode of the plurality of modes to another mode of the plurality of modes.

35. The smart card inlay as claimed in claim 34, wherein the step-up converter is configured to dynamically change its mode in response to a change in voltage of the input power signal.

36. The smart card inlay as claimed in claim 35, wherein the step-up converter is configured to:
measure the voltage of the input power signal;
if the measured voltage exceeds a first threshold voltage, operate in a first mode;
if the measured voltage exceeds a second threshold voltage but does not exceed the first threshold voltage, operate in a second mode; and
if the measured voltage does not exceed the second threshold voltage, operate in a third mode, and
further wherein the voltage of the input power signal is increased by a greater factor in the second mode than in the first mode, and the voltage of the input power signal is increased by a greater factor in the third mode than in the second mode.

37. A smart card inlay comprising:
an inductive antenna configured to (i) communicate wirelessly with a card terminal, and (ii) power a card circuitry via inductive coupling to the card terminal; and
a DC-DC converter having an input coupled to the inductive antenna and an output connectable to the card circuitry, wherein
the DC-DC converter is configured to receive an input power signal from the inductive antenna and convert the input power signal into an output power signal provided to the card circuitry,
the output power signal matches an operating current and/or operating voltage of the card circuitry,
the DC-DC converter is configured to change a voltage of the input power signal to the operating voltage of the card circuitry using an inverting converter, and
the inverting converter is configured to provide a voltage below ground.

38. The smart card inlay as claimed in claim 37, wherein the inverting converter comprises at least one capacitive charge pump.

* * * * *